United States Patent
Choi et al.

(10) Patent No.: US 11,281,512 B2
(45) Date of Patent: Mar. 22, 2022

(54) STORAGE DEVICE PROVIDING DEVICE-TO-HOST INFORMATION TO HOST AND OPERATING METHOD THEREOF

(71) Applicant: SK hynix Inc., Gyeonggi-do (KR)

(72) Inventors: Kwang Ho Choi, Seoul (KR); Joong Yong Jeon, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/515,705

(22) Filed: Jul. 18, 2019

(65) Prior Publication Data
US 2020/0142766 A1  May 7, 2020

(30) Foreign Application Priority Data

Nov. 1, 2018 (KR) .................. 10-2018-0132968

(51) Int. Cl.
*G06F 11/07* (2006.01)
*G06F 12/02* (2006.01)
*G06F 12/0868* (2016.01)

(52) U.S. Cl.
CPC ...... *G06F 11/0721* (2013.01); *G06F 12/0253* (2013.01); *G06F 12/0868* (2013.01)

(58) Field of Classification Search
None
See application file for complete search history.

(56) References Cited

U.S. PATENT DOCUMENTS

| 2011/0093627 A1* | 4/2011 | De | G06F 9/4401 |
| | | | 710/33 |
| 2013/0086311 A1* | 4/2013 | Huang | G06F 3/0659 |
| | | | 711/103 |
| 2014/0149706 A1* | 5/2014 | Shim | G06F 13/28 |
| | | | 711/165 |

FOREIGN PATENT DOCUMENTS

| KR | 10-2009-0053164 | 5/2009 |
| KR | 10-2018-0078417 | 7/2018 |

OTHER PUBLICATIONS

Serial ATA AHCI 1.3.1 Specification [online], Aug. 2017 [retrieved on Jun. 13, 2020]. Retrieved from the Internet:<URL:https://www.intel.com/content/dam/www/public/us/en/documents/technical-specifications/serial-ata-ahci-spec-rev1-3-1.pdf> (Year: 2017).*

* cited by examiner

*Primary Examiner* — Edward J Dudek, Jr.
*Assistant Examiner* — Ralph A Verderamo, III
(74) *Attorney, Agent, or Firm* — IP & T Group LLP

(57) ABSTRACT

A storage device having an improved operation speed includes a memory device and a memory controller for controlling the memory device. The memory controller includes: a Device-To-Host (DTH) information generator configured to generate DTH information to be transferred to a host, a host memory accessor configured to provide the host with the DTH information received from the DTH information generator and an interrupt signal generator configured to output, to the host, an interrupt signal notifying that the DTH information has been provided to the host, based on a request from the host memory accessor.

18 Claims, 15 Drawing Sheets

FIG. 4

| CLASSIFICATION | STATUS INFORMATION (STA_INF) |
|---|---|
| Device Background Operation Status | Preparing for background operation like garbage collection or wear leveling |
| | In progress of performing the background operation generating a long latency |
| | Complete the background operation. Host can issue the CMD normally |
| Device Severity Level | Detect a high thermal condition |
| | Cannot operate in response to I/O command because of NVM memory defect |
| | cannot recover an internal error |

# STORAGE DEVICE PROVIDING DEVICE-TO-HOST INFORMATION TO HOST AND OPERATING METHOD THEREOF

CROSS-REFERENCE TO RELATED APPLICATION

The present application claims priority under 35 U.S.C. § 119(a) to Korean patent application number 10-2018-0132968, filed on Nov. 1, 2018, which is incorporated herein by reference in its entirety.

BACKGROUND

Field of Invention

The present disclosure generally relates to an electronic device, and more particularly, to a storage device and an operating method thereof.

Description of Related Art

A storage device stores data under the control of a host device such as a computer, a smart phone or a smart pad. The storage device may be a magnetic disk, such as a Hard Disk Drive (HDD), or a device for storing data on a semiconductor memory, i.e., a nonvolatile memory, such as a Solid State Drive (SSD) or a memory card.

The storage device may include a memory device for storing data and a memory controller for controlling the memory device. The memory device is either a volatile memory device or a nonvolatile memory device. The nonvolatile memory device may be any of a Read Only Memory (ROM), a Programmable ROM (PROM), an Electrically Programmable ROM (EPROM), an Electrically Erasable and Programmable ROM (EEPROM), a flash memory, a Phase-change RAM (PRAM), a Magnetic RAM (MRAM), a Resistive RAM (RRAM), a Ferroelectric RAM (FRAM), and the like.

SUMMARY

Embodiments provide a storage device having an improved operation speed and an operating method thereof.

In accordance with an aspect of the present disclosure, there is provided a storage device including a memory device and a memory controller for controlling the memory device, wherein the memory controller includes: a Device-To-Host (DTH) information generator configured to generate DTH information to be transferred to a host, a host memory accessor configured to provide the host with the DTH information received from the DTH information generator and an interrupt signal generator configured to output, to the host, an interrupt signal notifying that the DTH information has been provided to the host, based on a request from the host memory accessor.

In accordance with another aspect of the present disclosure, there is provided a method for operating a storage device including a memory device and a memory controller for controlling the memory device, the method including: generating a Device-To-Host (DTH) information transferred to a host; providing the DTH information to a host memory buffer area in a memory of the host; generating an interrupt signal notifying that the DTH information has been provided to the host; and outputting the generated interrupt signal to the host.

In accordance with another aspect of the present disclosure, there is provided a host for controlling a storage device including a memory device and a memory controller for controlling the memory device, the host comprising: a host memory configured to store Device-To-Host (DTH) information of the storage device and a central processing unit configured to receive an interrupt signal notifying that the DTH information of the storage device has been stored, and acquire the DTH information stored in the host memory, based on the interrupt signal, wherein the DTH information includes status information of the storage device.

In accordance with another aspect of the present disclosure, there is provided a method for operating a host for controlling a storage device including a memory device and a memory controller for controlling the memory device, the method comprising: receiving Device-To-Host (DTH) information representing a status of the storage device from the storage device, receiving an interrupt signal from the storage device and requesting, when the interrupt signal is a signal notifying that the DTH information has been stored in the host, the DTH information.

In accordance with another aspect of the present disclosure, there is provided a memory controller coupled between a host and a memory device, the memory controller comprising: a Device-To-Host (DTH) information generator configured to provide DTH information to the host to control the host to store the DTH information therein, the DTH information including status information of the memory device and the memory controller and a notification component configured to notify the host of the storage of the DTH information for the host to perform an operation based on the stored DTH information.

BRIEF DESCRIPTION OF THE DRAWINGS

Various embodiments will now be described more fully hereinafter with reference to the accompanying drawings; however, elements and features of the present invention may be configured or arranged differently than disclosed herein. Thus, the present invention is not limited to the embodiments set forth herein. Rather, these embodiments are provided so that this disclosure is thorough and complete and fully conveys the scope of the disclosed embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 4 is a diagram illustrating status information of the storage device, which is to be included in DTH information.

DETAILED DESCRIPTION

Figure 1:
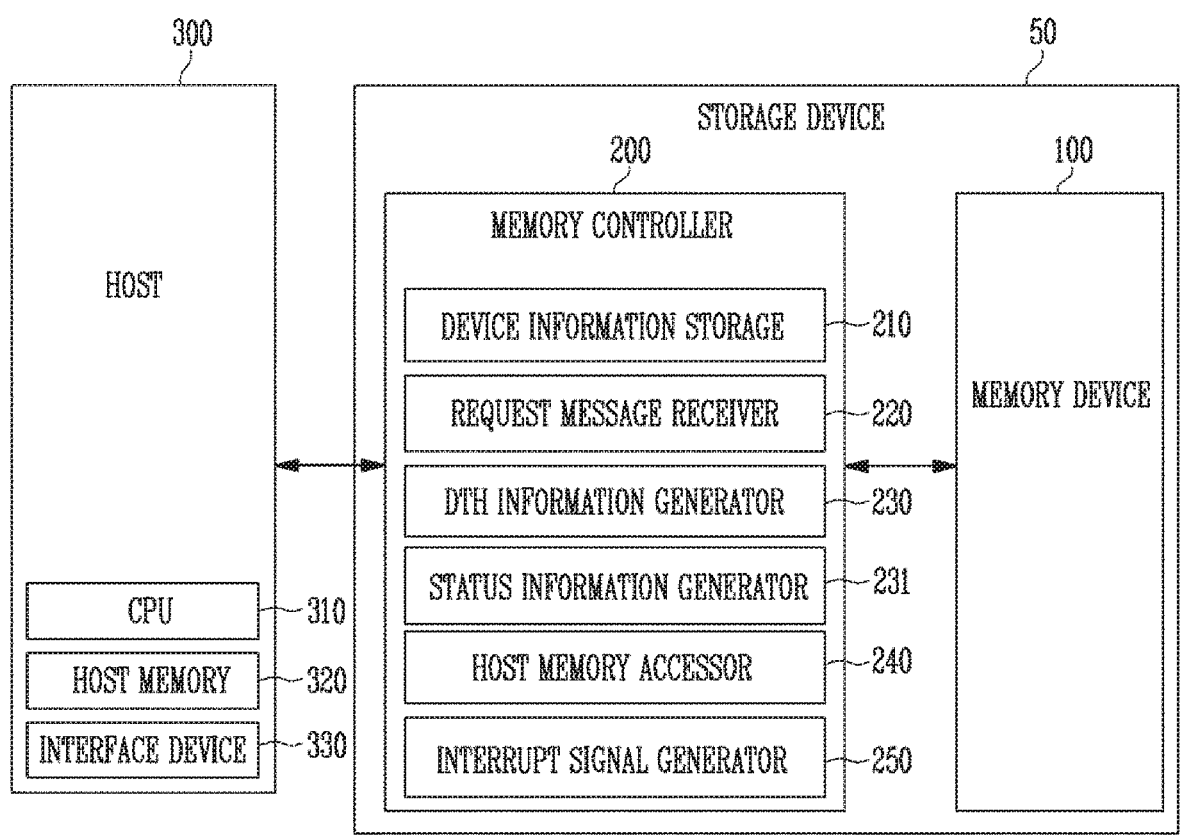
FIG. 1 is a block diagram illustrating a storage device.

The specific structural and functional description provided herein is for the purpose of describing embodiments of the present disclosure. The embodiments can be implemented in various forms, and thus the present invention is not to be construed as limited to the embodiments set forth herein. Also, throughout the specification, reference to "an embodiment," "another embodiment" or the like is not necessarily to only one embodiment, and different references to any such phrase are not necessarily to the same embodiment(s).

The embodiments of the present disclosure can be modified in various ways. Thus, the embodiments of the present disclosure are not to be construed as limited to specific details. Rather, the present invention includes all changes, equivalents, or substitutes that do not depart from the spirit and technical scope of the present disclosure.

While terms such as "first" and "second" may be used to identify various components, such components are not limited to the above terms. The above terms are used only to distinguish one component from another that otherwise have the same or similar names. For example, a first component in one instance may be referred to as a second component in another instance, and vice versa, without departing from the scope of rights of the present disclosure.

It will be understood that when an element is referred to as being "connected" or "coupled" to another element, it can be directly connected or coupled to the other element or one or more intervening elements may also be present. In contrast, when an element is referred to as being "directly connected" or "directly coupled" to another element, no intervening elements are present. Other expressions describing relationships between components such as "~ between," "immediately ~ between" or "adjacent to ~" and "directly adjacent to ~" may be construed similarly.

The terms used in the present application are merely used to describe particular embodiments, and are not intended to limit the present disclosure. Singular forms in the present disclosure are intended to include the plural forms and vice versa, unless the context clearly indicates otherwise. It will be further understood that terms such as "including," "having," and other open-ended transition terms, are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

So far as not being differently defined, all terms used herein including technical or scientific terminologies have meanings that they are commonly understood by those skilled in the art to which the present disclosure pertains. The terms having the definitions as defined in the dictionary should be understood such that they have meanings consistent with the context of the related technique. So far as not being clearly defined in this application, terms should not be understood in an ideally or excessively formal way.

In describing those embodiments, description may be omitted for techniques that are well known to the art to which the present disclosure pertains and are not directly related to the present disclosure. By omitting unnecessary description, elements and features of the present invention may be understood more clearly.

Various embodiments of the present disclosure will be described in detail with reference to the accompanying drawings in order for those skilled in the art to be able to readily implement the present invention.

FIG. 1 is a block diagram illustrating a storage device.

Referring to FIG. 1, the storage device 50 may include a memory device 100 and a memory controller 200.

The storage device 50 may store data under the control of a host 300, such as a mobile phone, a smart phone, an MP3 player, a laptop computer, a desktop computer, a game console, a TV, a tablet PC or an in-vehicle infotainment.

The storage device 50 may be any one of various types of storage devices according to a host interface that determines a communication scheme with the host 300. For example, the storage device 50 may be implemented with any one of various types of storage devices such as a multi-media card of a Solid State Drive (SSD), a Multi-Media Card (MMC), an embedded, Multi-Media Card (eMMC), a Reduced Size, Multi-Media Card (RS-MMC), and a micro-Multi-Media Card (micro-MMC) type, a Secure Digital (SD) card of a Secure Digital (SD), a mini-Secure Digital (mini-SD) and a micro-Secure Digital (micro-SD) type, an Universal Serial Bus (USB) storage device, a Universal Flash Storage (UFS) device, a storage device of a Personal Computer Memory Card International Association (PCMCIA) card type, a storage device of a Peripheral Component Interconnection (PCI) card type, a storage device of a PCI-Express (PCI-E) card type, a Compact Flash (CF) card, a smart media card, and a memory stick.

The storage device 50 may be any one of various kinds of package types. For example, the storage device 50 may be any one of various kinds of package types such as a Package-On-Package (POP), a System-In-Package (SIP), a System-On-Chip (SOC), a Multi-Chip Package (MCP), a Chip-On-Board (COB), a Wafer-level Fabricated Package (WFP), and a Wafer-level Stack Package (WSP).

The memory device 100 may store data. The memory device 100 operates under the control of the memory controller 200. The memory device 100 may include a memory cell array including a plurality of memory cells for storing data. The memory cell array may include a plurality of planes. Each plane may include a plurality of memory blocks BLK1 to BLKz. Each memory block may include a plurality of memory cells. One memory block may include a plurality of pages. In an embodiment, the page may be a unit for storing data in the memory device 100 or reading data stored in the memory device 100. The memory block may be a unit for erasing data. In an embodiment, the memory device 100 may be a Double Data Rate Synchronous Dynamic Random Access Memory (DDR SDRAM), a Low Power Double Data Rate 4 (LPDDR4) SDRAM, a Graphics Double Data Rate (GDDR) SRAM, a Low Power DDR (LPDDR), a Rambus Dynamic Random Access Memory (RDRAM), a NAND flash memory, a vertical NAND flash memory, a NOR flash memory, a Resistive Random Access Memory (RRAM), a Phase-Change Random Access Memory (PRAM), a Magnetoresistive Random Access Memory (MRAM), a Ferroelectric Random Access Memory (FRAM), a Spin Transfer Torque Random Access Memory (SU-RAM), or the like. In this specification, by way of example, configurations and operations are described in the context of the memory device 100 implemented as a NAND flash memory.

In an embodiment, the memory device 100 may be implemented in a three-dimensional array structure. The present disclosure may be applied to not only a flash memory device in which a charge storage layer is configured with a Floating Gate (FG) but also a Charge Trap Flash (CTF) in which a charge storage layer is configured with an insulating layer.

In an embodiment, each of the memory cells in the memory device 100 may be configured as a Single Level Cell (SLC) for storing one data bit. In other embodiments, each of the memory cells in the memory device 100 may be configured as a Multi-Level Cell (MLC) for storing two data bits, a Triple Level Cell (TLC) for storing three data bits, or a Quad Level Cell (QLC) for storing four data bits.

The memory device 100 is configured to receive a command and an address from the memory controller 200 and access an area selected by the address in the memory cell array. That is, the memory device 100 may perform an operation corresponding to the command on the area selected by the address. For example, the memory device 100 may perform a write (program) operation, a read operation, and an erase operation. In the program operation, the memory device 100 may program data in the area selected by the address. In the read operation, the memory device 100 may read data from the area selected by the address. In the erase operation, the memory device 100 may erase data stored in the area selected by the address.

The memory device 100 may perform a program operation or an erase operation with a set operating voltage under the control of the memory controller 200.

The memory controller 200 may control overall operations of the storage device 50.

When power is applied to the storage device 50, the memory controller 200 may execute firmware (FW). When the memory device 100 is a flash memory device, the memory controller 200 may execute FW such as a Flash Translation Layer (FTL) for controlling communication between the host 300 and the memory device 100.

In an embodiment, the memory controller 200 may receive data and a Logical Block Address (LBA) from the host 300, and translate the LBA into a Physical Block Address (PBA) representing addresses of memory cells included in the memory device 100, in which data is to be stored. Also, the memory controller 200 may store, in a buffer memory, logical-physical address mapping information that establishes a mapping relationship between the LBA and the PBA.

The memory controller 200 may control the memory device 100 to perform a program operation, a read operation, an erase operation, or the like in response to a request from the host 300. In the program operation, the memory controller 200 may provide a program command, a PBA, and data to the memory device 100. In the read operation, the memory controller 200 may provide a read command and a PBA to the memory device 100. In the erase operation, the memory controller 200 may provide an erase command and a PBA to the memory device 100.

In an embodiment, the memory controller 200 may autonomously generate a program command, an address, and data without any request from the host 300, and transmit the program command, the address, and the data to the memory device 100. For example, the memory controller 200 may provide the command, the address, and the data to the memory device 100 to perform background operations such as a program operation for wear leveling and a program operation for garbage collection.

In an embodiment, the memory controller 200 may include a device information storage 210. The device information storage 210 may store device information of the storage device 50. The device information may include status information of the storage device 50, which is to be included in Device-To-Host (DTH) information provided to the host 300, and information on the size of a host memory buffer. The size of the host memory buffer may be the size of an area that is to be allocated so as to store the DTH information. The device information storage 210 may provide the device information to the host 300 in response to an information request message from the host 300.

In an embodiment, the memory controller 200 may include a request message receiver 220. The request message receiver 220 may receive a request message from the host 300. The request message received from the host 300 may be a set parameter request message or DTH information request message. The request message receiver 220 may generate a command in response to the request message received from the host 300. The memory controller 200 may perform an operation corresponding to the command generated by the request message receiver 220.

In an embodiment, the memory controller 200 may include a DTH information generator 230. The DTH information generator 230 may generate DTH information to be provided to the host 300 by the storage device 50. The DTH information may include status information of the storage device 50, which is to be identified by the host 300. The DTH information generator 230 may generate DTH information in response to the DTH information request message received from the host 300, or generate the DTH information autonomously even in the absence of such request.

The DTH information generated by the DTH information generator 230 may include status information of the storage device 50. The status information of the storage device 50 may be received from a status information generator 231. When the status of the storage device 50 is changed, the DTH information generator 230 may generate DTH information including information on the changed status. The DTH information generator 230 may provide the generated DTH information to a host memory accessor 240.

In an embodiment, the memory controller 200 may include the status information generator 231. The status information generator 231 may generate status information on the status of the storage device 50. The status information generated by the status information generator 231 may include information that is to be identified by the host 300. The status information may include information on a status of the memory controller 200 and/or the memory device 100. Specifically, the status information generator 231 may generate status information, based on data received from the memory device 100 and/or data received in the memory controller 200.

The status information generator 231 may check the status of the storage device 50 based on the received data. The status information generator 231 may check whether the status of the storage device 50 has been changed. Specifically, when the status information generator 231 checks the status of the storage device 50, a current status different from a previous status may be checked. When the status of the storage device 50 is changed, the status information generator 231 may generate status information on the changed status.

In an embodiment, the memory controller 200 may include the host memory accessor 240. The host memory accessor 240 may receive DTH information from the DTH information generator 230. The host memory accessor 240 may provide the DTH information to a host memory 320. The DTH information may be stored in the host memory buffer of the host memory 320.

After the host memory accessor 240 provides the DTH information to the host memory 320, and the host memory accessor 240 may request, through an interrupt signal generation request, an interrupt signal generator 250 to generate an interrupt signal. The interrupt signal may notify that DTH information has been stored in the host memory buffer of the host memory 320. The interrupt signal may be identified by the host 300.

In an embodiment, the memory controller 200 may include the interrupt signal generator 250. The interrupt signal generator 250 may generate the interrupt signal in response to the interrupt signal generation request from the host memory accessor 240. The interrupt signal generator 250 may output the interrupt signal to the host 300. Specifically, the interrupt signal generator 250 may provide the interrupt signal to a Central Processing Unit (CPU) 310 of the host 300.

In an embodiment, the memory controller 200 may control at least two memory devices 100. The memory controller 200 may control the memory devices according to an interleaving scheme so as to improve operational performance.

The host 300 may communicate with the storage device 50, using at least one of various communication protocols, such as a Universal Serial bus (USB), a Serial AT Attachment (SATA), a High Speed InterChip (HSIC), a Small Computer System Interface (SCSI), Firewire, a Peripheral Component Interconnection (PCI), a PCI express (PCIe), a Non-Volatile Memory express (NVMe), a universal flash storage (UFS), a Secure Digital (SD), a Multi-Media Card (MMC), an embedded MMC (eMMC), a Dual In-line Memory Module (DIMM), a Registered DIMM (RDIMM), and a Load Reduced DIMM (LRDIMM).

In an embodiment, the host 300 may include the CPU 310. The CPU may provide the device information request message to the storage device 50. Specifically, the device information request message may be provided to the device information storage 210 included in the storage device 50. The device information request message may be for allowing the host 300 to acquire the device information of the storage device 50. The device information may include status information of the storage device 50, which is to be included in DTH information provided to the host 300 and information on the size of a host memory buffer. The size of the host memory buffer may be the size of an area that is to be allocated so as to store the DTH information within the host memory 320.

The CPU 310 may receive the device information from the device information storage 210. The CPU 310 may provide the received device information to the host memory 320.

In an initialization operation, the CPU 310 may provide a set parameter request message to the storage device 50. The set parameter request message may be a request message for storing, in the storage device 50, a parameter for DTH information that is to be identified by the host 300 and a parameter for an interrupt signal that is to be identified by the host 300.

In an embodiment, the host 300 may include the host memory 320. The host memory 320 may be configured as a volatile memory or nonvolatile memory.

The host memory 320 may store data. The data stored in the host memory 320 may include status information of the storage device 50. The host memory 320 may allocate the host memory buffer so as to store the status information of the storage device 50.

Figure 8:
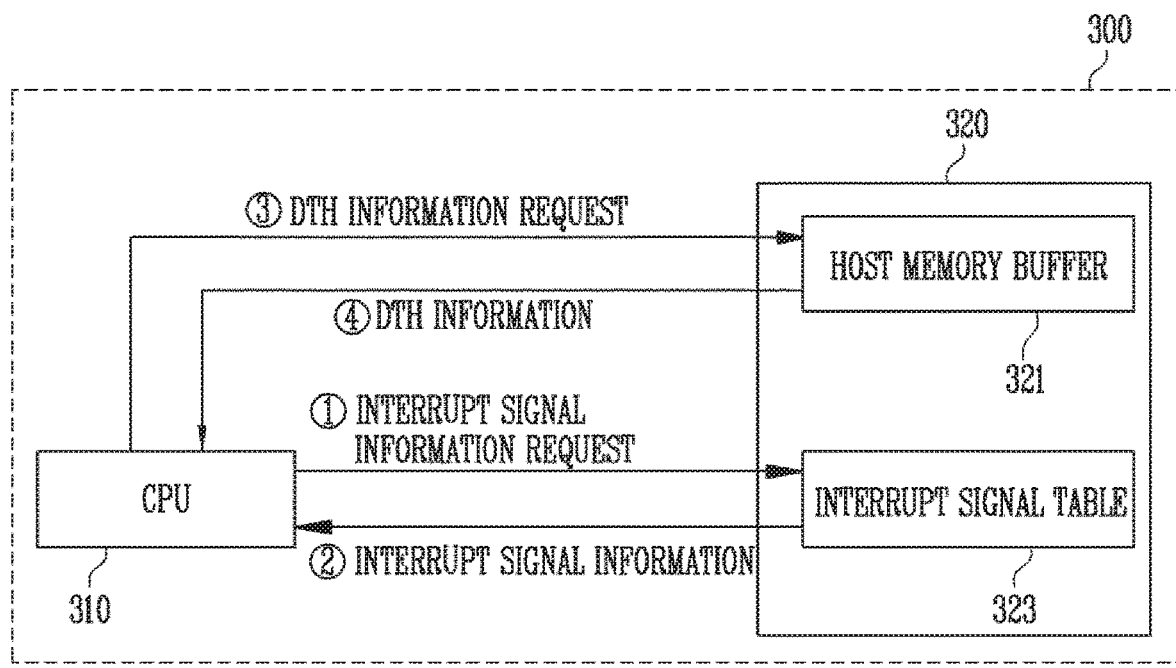
FIG. 8 is a diagram illustrating a method for acquiring, by the host, DTH information.

The host memory 320 may include an interrupt signal table 323 (see FIG. 8). The interrupt signal table 323 may include information on an interrupt signal that is to be identified by the host 300. The host memory 320 may provide the CPU 310 with information on an interrupt signal notifying that status information of the storage device 50 has been stored.

The host 300 may include an interface device 330. The host 300 may communicate with the storage device 50 through the interface device 330. Specifically, the host 300 may provide a message or information to the storage device 50 through the interface device 330. Alternatively, the host 300 may receive a signal or information from the storage device 50.

In an embodiment, the message provided by the host 300 through the interface device 330 may be any one of the device information request message, the set parameter request message, and the DTH information request message. The DTH information may be provided to the host 300 by the storage device 50. The DTH information may include status information of the storage device 50.

In an embodiment, the information received by the host 300 through the interface device 330 may be the DTH information. The signal received by the host 300 through the interface device 330 may be the interrupt signal. The interrupt signal may notify that status information of the storage device has been stored in the host memory buffer.

Figure 2:
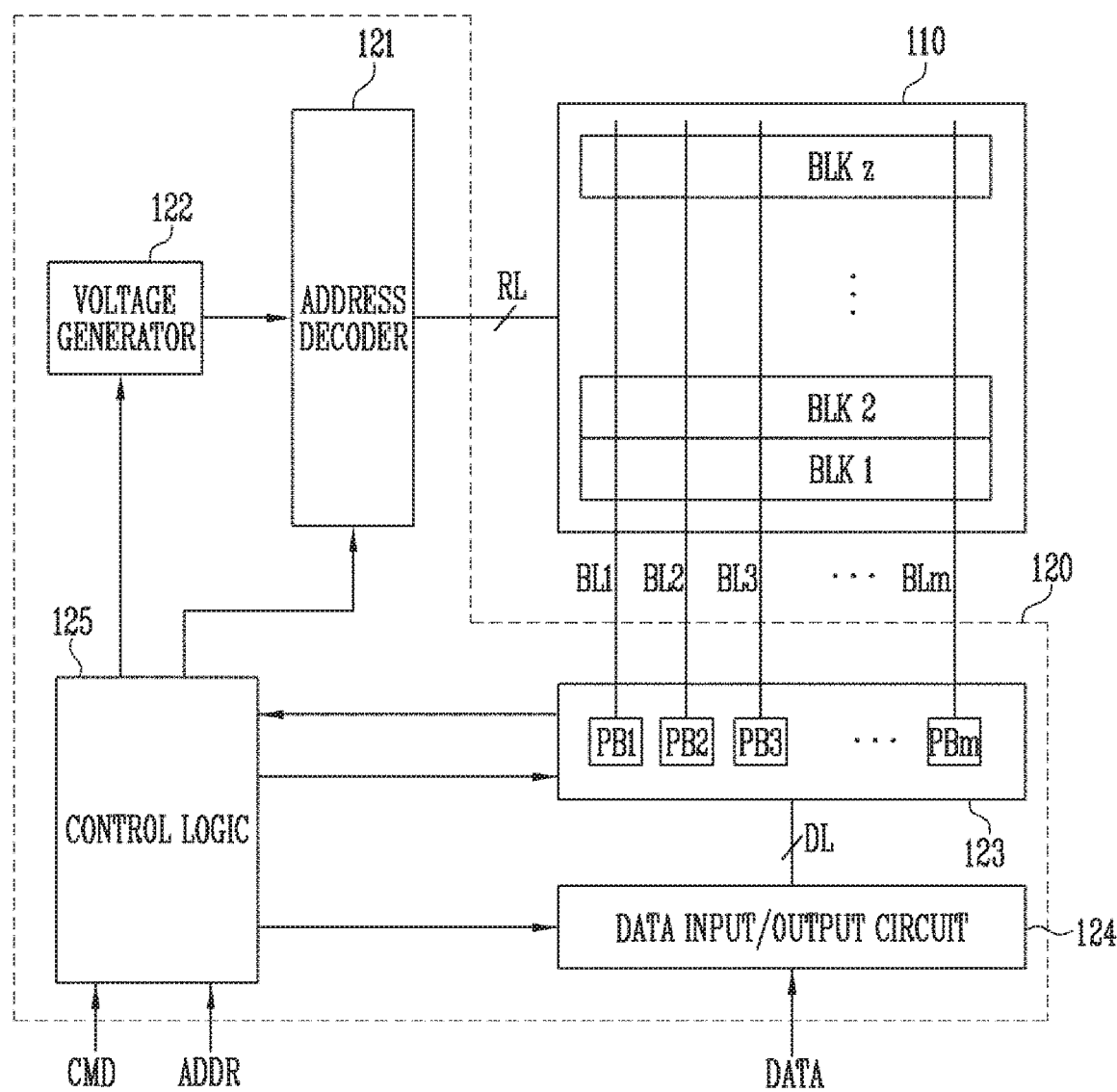
FIG. 2 is a block diagram illustrating a structure of a memory device of FIG. 1.

FIG. 2 is a block diagram illustrating a structure of the memory device of FIG. 1.

Referring to FIG. 2, the memory device 100 includes a memory cell array 110 and a peripheral circuit 120.

The memory cell array 110 may include a plurality of memory blocks BLK1 to BLKz. The plurality of memory blocks BLK1 to BLKz are coupled to an address decoder 121 through row lines RL, and are coupled to a read/write circuit 123 through bit lines BL1 to BLm. Each of the plurality of memory blocks BLK1 to BLKz includes a plurality of memory cells. In an embodiment, the plurality of memory cells are nonvolatile memory cells.

A plurality of memory cells included in the memory cell array may be divided into a plurality of blocks according to usage thereof. System information as various setting information necessary to control the memory device 100 may be stored in the plurality of blocks.

Each of first to zth memory blocks BLK1 to BLKz includes a plurality of cell strings. First to mth cell strings are coupled to first to mth bit lines BL1 to BLm, respectively. Each of the first to mth cell strings includes a drain select transistor, a plurality of memory cells coupled in series, and a source select transistor. The drain select transistor is coupled to a drain select line. First to nth memory cells are coupled to first to nth word lines. The source select transistor is coupled to a source select line. A drain side of the drain select transistor is coupled to a corresponding bit line. The drain select transistors of the first to mth cell strings are coupled to the first to mth bit lines BL1 to BLm, respectively. A source side of the source select transistor is coupled to a common source line. In an embodiment, the common source line may be commonly coupled to the first to zth memory blocks BLK1 to BLKz. The drain select line DSL, the first to nth word lines, and the source select line are included in the row lines RL. The drain select line DSL, the first to nth word lines, and the source select line are controlled by the address decoder 121. The common source line is controlled by the control logic 125. The first to mth bit lines BL1 to BLm are controlled by the read/write circuit 123.

The peripheral circuit 120 includes the address decoder 121, a voltage generator 122, the read/write circuit 123, a data input/output circuit 124, and the control logic 125.

The address decoder 121 is coupled to the memory cell array 110 through the row lines RL. The address decoder 121 is configured to operate under the control of the control logic 125. The address decoder 121 receives an address ADDR through the control logic 125.

In an embodiment, a program operation and a read operation of the memory device 100 are performed in units of pages.

In the program and read operations, the address ADDR received by the control logic 125 may include a block address and a row address. The address decoder 121 is configured to decode the block address in the received address ADDR. The address decoder 121 selects one memory block among the memory blocks BLK1 to BLKz according to the decoded block address.

The address decoder 121 is configured to decode the row address in the received address ADDR. The address decoder 121 selects one word line of a selected memory block by applying voltages provided from the voltage generator 122 to the row lines RL according to the decoded row address.

In an erase operation, the address ADDR includes a block address. The address decoder 121 decodes the block address, and selects one memory block according to the decoded block address. The erase operation may be performed on the whole or a portion of the one memory block.

In a partial erase operation, the address ADDR may include block and row addresses. The address decoder 121 selects one memory block among the memory blocks BLK1 to BLKz according to the block address.

The address decoder 121 is configured to decode the row addresses in the received address ADDR. The address decoder 121 selects at least one word line of the selected memory block by applying voltages provided from the voltage generator 122 to the row lines RL according to the decoded row addresses.

In an embodiment, the address decoder 121 may include a block decoder, a word line decoder, an address buffer, and the like.

The voltage generator 122 generates a plurality of voltages, using an external power voltage supplied to the memory device 100. The voltage generator 122 operates under the control of the control logic 125.

In an embodiment, the voltage generator 122 may generate an internal power voltage by regulating the external power voltage. The internal power voltage generated by the voltage generator 122 is used as an operating voltage of the memory device 100.

In an embodiment, the voltage generator 122 may generate a plurality of voltages, using the external power voltage or the internal power voltage.

For example, the voltage generator 122 may include a plurality of pumping capacitors for receiving the internal power voltage, and generate a plurality of voltages by selectively activating the plurality of pumping capacitors under the control of the control logic 125. The plurality of generated voltages are applied to word lines selected by the address decoder 121.

In a program operation, the voltage generator 122 may generate a high-voltage program pulse and a pass pulse lower than the program pulse. In a read operation, the voltage generator 122 may generate a read voltage and a pass voltage higher than the read voltage. In an erase operation, the voltage generator 122 may generate an erase voltage.

The read/write circuit 123 includes first to mth page buffers PB1 to PBm. The first to mth page buffers PB1 to PBm are coupled to the memory cell array 110 respectively through the first to mth bit lines BL1 to BLm. The first to mth page buffers PB1 to PBm operate under to control of the control logic 125.

The first to mth page buffers PB1 to PBm communicate data with the data input/output circuit 124. In a program operation, the first to mth page buffers PB1 to PBm receive data DATA to be stored through the data input/output circuit 124 and data lines DL.

In a program operation, when a program pulse is applied to a selected word line, the first to mth page buffers PB1 to PBm may transfer the data DATA received through the data input/output circuit 124 to selected memory cells through the bit lines BL1 to BLm. Memory cells of a selected page are programmed according to the transferred data DATA. A memory cell coupled to a bit line to which a program allow voltage (e.g., a ground voltage) is applied may have an increased threshold voltage. A threshold voltage of a memory cell coupled to a bit line to which a program inhibit voltage (e.g., a power voltage) is applied may be maintained. In a program verify operation, the first to mth page buffers PB1 to PBm read page data from selected memory cells through the bit lines BL1 to BLm.

In a read operation, the read/write circuit 123 reads data DATA from memory cells of a selected page through the bit lines BL, and outputs the read data DATA to the data input/output circuit 124. In an erase operation, the read/write circuit 123 may float the bit lines BL.

In an embodiment, the read/write circuit 123 may include a column select circuit.

The data input/output circuit 124 is coupled to the first to mth page buffers PB1 to PBm through the data lines DL. The data input/output circuit 124 operates under the control of the control logic 125. In a program operation, the data input/output circuit 124 receives data DATA to be stored from an external controller (not shown).

The control logic 125 is coupled to the address decoder 121, the voltage generator 122, the read/write circuit 123, and the data input/output circuit 124. The control logic 125 may control overall operations of the memory device 100. The control logic 125 receives a command CMD and an address ADDR. The control logic 125 controls the address decoder 121, the voltage generator 122, the read/write circuit 123, and the data input/output circuit 124 in response to the command CMD.

Figure 3:
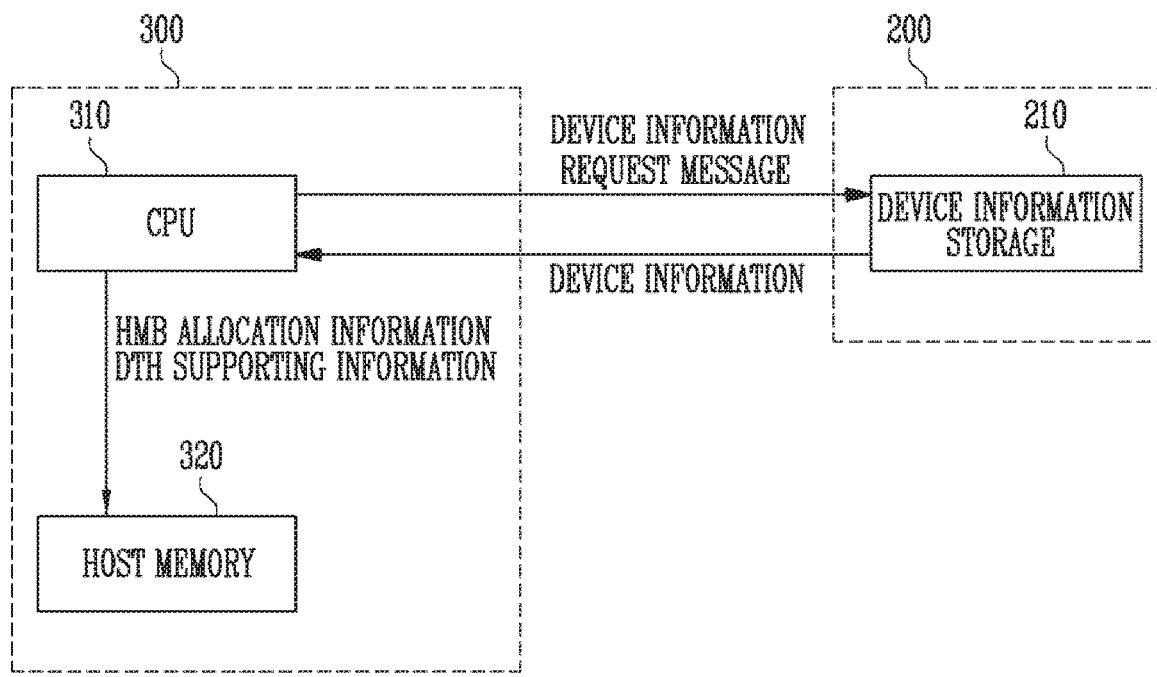
FIG. 3 is a diagram illustrating an initialization operation for storing Device-To-Host (DTH) information in a host memory.

FIG. 3 is a diagram illustrating an initialization operation for storing DTH information in the host memory.

Referring to FIG. 3, the memory controller 200 may include the device information storage 210. In FIG. 3, the request message receiver 220, the DTH information generator 230, the status information generator 231, the host memory accessor 240, and the interrupt signal generator 250 of the memory controller 200 are omitted for clarity.

Referring to FIG. 3, the host 300 may include the CPU 310 and the host memory 320. In FIG. 3, the interface device 330 of the host 300 is omitted for clarity.

The device information storage 210 may include the device information including information of the storage device 50. Specifically, the device information may include the status information of the storage device 50, which is to be included in DTH information, and information on the size of a host memory buffer. The host memory buffer may be an area for storing the DTH information. The size of the host memory buffer may be the size of an area that is to be allocated so as to store the DTH information within the host memory 320.

The status information of the storage device 50 will be described in more detail with reference to FIG. 4.

The device information storage 210 may provide the device information to the CPU 310 in the host 300 in response to a request, e.g., device information request message, from the CPU 310.

The CPU 310 may perform an initialization operation for acquiring the DTH information. In an embodiment, the CPU 310 may provide the device information request message to the device information storage 210. The device information request message may be for requesting the device information of the storage device 50. The device information storage 210 may provide the device information stored in the device information storage 210 to the CPU 310 in response to the device information request message.

The CPU 310 may provide the host memory 320 with Host Memory Buffer (HMB) allocation information and DTH supporting information, based on the device information received from the device information storage 210.

The HMB allocation information may include information on the size of the host memory buffer 321 (see FIG. 6) that is to be allocated in the host memory 320 so as to store the DTH information. When the host memory 320 receives the HMB allocation information, the host memory 320 may allocate an area for storing the DTH information, which area may be the host memory buffer 321.

The DTH supporting information may include status information of the storage device 50, which is to be provided to the host 300 by the storage device 50. That is, the DTH supporting information may include status information of the storage device 50, which is to be included in the DTH information.

FIG. 4 is a diagram illustrating status information STA_INF of the storage device 50, which is to be included in DTH information.

Referring to FIG. 4, the status information STA_INF of the storage device 50 may be classified into information representing a device background operation status and information representing a device severity level. The status information STA_INF of the storage device 50 may include various status information in addition to the device background operation status information and device severity level information. The status information STA_INF of the storage device 50 may include various status information in response to a request from the host 300.

Specifically, the device background operation status may include information representing a state in which the storage device 50 prepares for a background operation like garbage collection or wear leveling, information representing that the storage device 50 is in process of performing the background operation generating a long latency, and information representing a state in which the storage device 50 completes the background operation, and the host can issue the CMD normally. The device background operation status may include various information in addition to the above-described information.

The state in which the storage device 50 prepares for background operation like garbage collection or wear leveling may represent that the storage device 50 is to perform a background operation before the storage device 50 performs a specific operation.

Specifically, the background operation may include an operation of copying data stored in an arbitrary memory block to another arbitrary memory block, e.g., a Garbage Collection (GC) operation. Also, the background operation may include an operation of performing processing by swapping between memory blocks of the memory device 100 or between data stored in memory blocks, e.g., a Wear Leveling (WL) operation. The background operation may include an operation of storing map data stored in the memory controller 200 in memory blocks of the memory device 100, e.g., a map flush operation, an operation of performing bad block management on the memory device 100, e.g., a bad block management operation of checking and processing a bad block in a plurality of memory blocks included in the memory device 100, or the like.

The information representing that the storage device 50 is in process of performing the background operation generating a long latency may represent that the storage device 50 is performing a background operation where it takes a long time to perform a next operation after the storage device 50 completes the background operation.

The information representing a state in which the storage device 50 completes the background operation and the host can issue the CMD normally may represent that the storage device 50 has completely performed a GC operation, a WL operation, and a bad block management operation.

In embodiment, the information representing a device severity level may include information representing detection of a high thermal collection, information representing a state in which the storage device 50 cannot operate in response to I/O command because of NVM memory defect, and information representing a state in which the storage device 50 cannot recover an internal error. The information representing a device severity level may include various information in addition to the above-described information.

Specifically, the information representing detection of a high thermal condition may represent that the temperature of the storage device 50 has been increased by a number of write and erase operations performing in the storage device 50 and/or a data retention period. Also, the information representing detection of a high thermal condition may represent that the temperature of the storage device 50 has been increased by an external or internal environmental factor of the storage device 50.

The information representing a state in which the storage device 50 can't operate in response to an I/O command because of NVM memory defect may represent a state in which the lifespan of the storage device 50 is expired or a state in which the storage device 50 cannot perform an operation any more due to a physical defect of the storage device 50. Specifically, as the memory device 100 is highly integrated and performs an operation at high speed, a physical defect of the storage device 50 may occur. The storage device 50 in which the physical defect has occurred may be processed as a failure, and it may be determined that the storage device 50 does not perform an operation any more.

The information representing a state in which the storage device 50 can't recover an internal error may represent a state in which an error has occurred while the storage device 50 is performing an operation, and the occurring error cannot be recovered by a recovery operation. Specifically, the state in which the storage device 50 can't recover an internal error may represent a case where an Uncorrectable ECC (UECC) has occurred.

Figure 5:
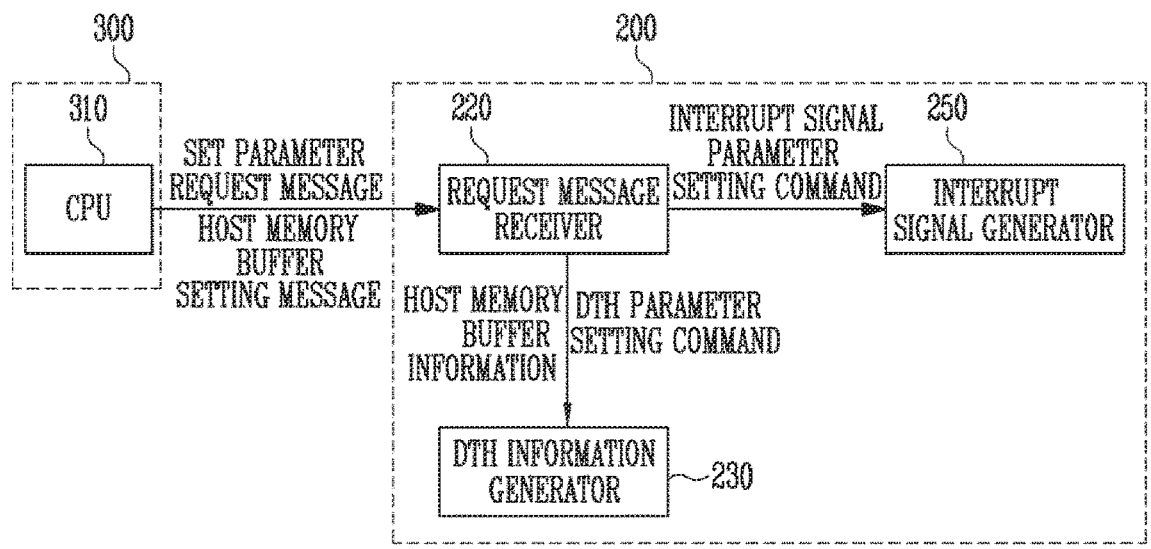
FIG. 5 is a diagram illustrating an initialization operation for storing DTH information in the host memory.

FIG. 5 is a diagram illustrating an initialization operation for storing DTH information in the host memory.

Referring to FIG. 5, the memory controller 200 may include the request message receiver 220, the DTH information generator 230, and the interrupt signal generator 250. In FIG. 5, the device information storage 210, the status information generator 231, and the host memory accessor 240 of the memory controller 200 are omitted for clarity.

Referring to FIG. 5, the host 300 may include the CPU 310. In FIG. 5, the host memory 320 and the interface device 330 of the host 300 are omitted for clarity.

The CPU 310 may provide a set parameter request message to the request message receiver 220 so as to set a parameter for generation of information that is to be identified by the host 300 and output of a signal that is to be identified by the host 300. The information that is to be identified by the host 300 may be DTH information. The signal that is to be identified by the host 300 may be the interrupt signal.

The request message receiver 220 may provide the DTH information generator 230 and the interrupt signal generator 250 with a command corresponding to the set parameter request message.

Specifically, the command provided to the DTH information generator 230 may be a DTH parameter setting command. The DTH information generator 230 may store a parameter for DTH information that is to be identified by the host 300 in response to the DTH parameter setting command. After the DTH information generator 230 stores the parameter for the DTH information, the DTH information generator 230 may generate the DTH information that is to be identified by the host 300.

In an embodiment, the command provided to the interrupt signal generator 250 may be an interrupt signal parameter setting command. The interrupt signal generator 250 may store a parameter for the interrupt signal that is to be identified by the host 300 in response to the interrupt signal parameter setting command. After the interrupt signal generator 250 stores the parameter for the interrupt signal, the interrupt signal generator 250 may generate and output the interrupt signal that is to be identified by the host 300 when the DTH information is provided to the host 300.

In an embodiment, the CPU 310 may provide a host memory buffer setting message to the request message receiver 220 so as to provide information on the host memory buffer in which the DTH information is stored after the CPU 310 receives device information from the storage device 50. The host memory buffer setting message may be for storing host memory buffer information allocated by the host memory 320. The request message receiver 220 may provide the DTH information generator 230 with the host memory buffer information of the host memory buffer setting message. The DTH information generator 230 may provide the DTH information to the host memory buffer 321 through the host memory accessor 240 based on the stored host memory buffer information.

The host memory buffer information may include information on a location for storing the DTH information. Specifically, the host memory buffer information may include information on row and column addresses of the location in which the DTH information is to be stored. The DTH information generator 230 may provide the DTH information to the host memory buffer 321 to store the provided DTH information at the location, which corresponds to specific row and column addresses, based on the host memory buffer information.

Figure 6:
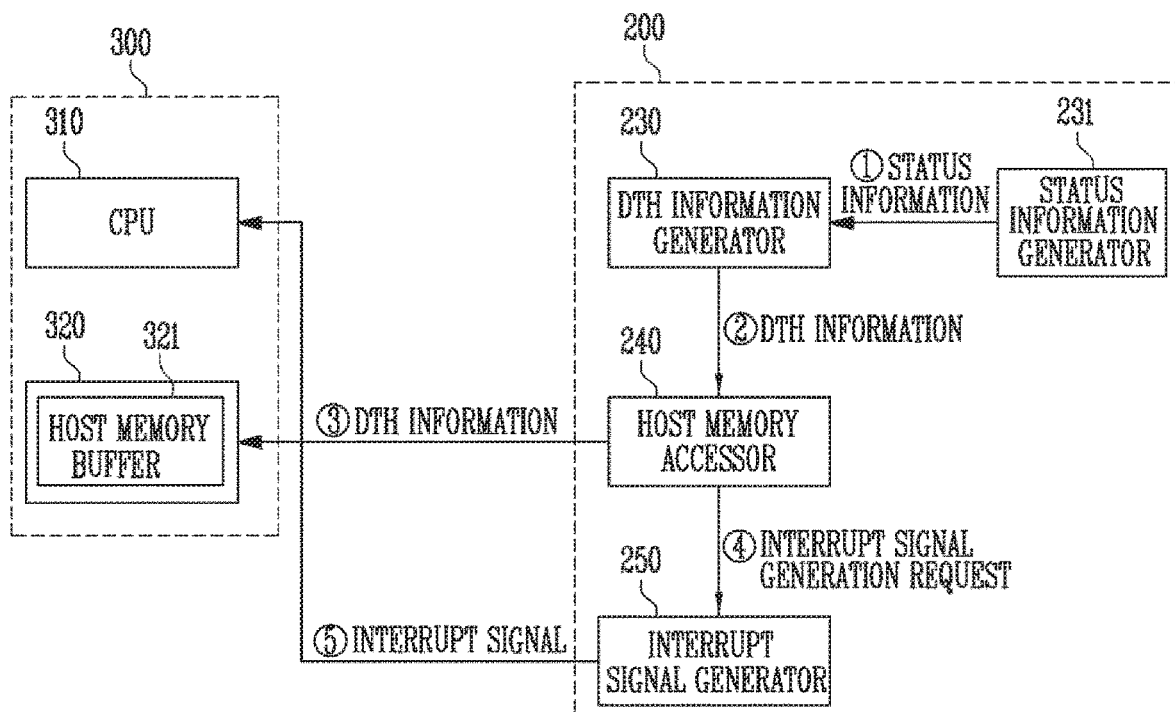
FIG. 6 is a diagram illustrating a method for providing, by a memory controller, DTH information to a host.

FIG. 6 is a diagram illustrating a method for providing, by the memory controller, DTH information to the host.

FIG. 6 illustrates a method for autonomously generating, by the DTH information generator 230, DTH information and providing the DTH information to the host memory buffer 321, even in the absence of a request from the host 300.

Referring to FIG. 6, the memory controller 200 may include the DTH information generator 230, the status information generator 231, the host memory accessor 240, and the interrupt signal generator 250. In FIG. 6, the device information storage 210 and the request message receiver 220 of the memory controller 200 are omitted for clarity.

Referring to FIG. 6, the host 300 may include the CPU 310 and the host memory 320. In FIG. 6, the interface device 330 of the host 300 is omitted for clarity.

The DTH information generator 230 may generate DTH information to be transferred to the host 300. The generated DTH information may be provided to the host memory buffer 321 in the host memory 320.

The DTH information generator 230 may receive from the status information generator 231 status information of the storage device 50 that is to be identified by the host 300 at step ①. The status information may include information on a status of the memory controller 200 and/or the memory device 100. Specifically, the status information generator 231 may generate the status information, based on data received from the memory device 100 and/or data received in the memory controller 200.

The DTH information generator 230 may generate DTH information including the status information provided from the status information generator 231. When the status of the storage device 50 is changed, the DTH information generator 230 may generate DTH information including changed status information. The changed status information may be received from the status information generator 231. The DTH information generator 230 may generate DTH information whenever the status of the storage device 50 is changed. The generated DTH information may be provided to the host memory accessor 240 at step ②.

The DTH information provided to the host memory accessor 240 may be stored in the host memory buffer 321 or other designated area in the host memory 320, referred to below as simply the host memory buffer 321. Therefore, the DTH information stored in the host memory buffer 321 may be updated whenever the status of the storage device 50 is changed.

The host memory accessor 240 may receive the DTH information from the DTH information generator 230. The host memory accessor 240 may provide the received DTH information to the host memory buffer 321 in the host memory 320 at step ③. The DTH information may be stored in the host memory buffer 321.

When the DTH information is stored in the host memory buffer 321, the host memory accessor 240 may request, through an interrupt signal generation request, generation of the interrupt signal notifying that the DTH information has been provided and stored in the host memory buffer 321 at step ④. The interrupt signal may notify that the DTH information has been provided and stored in the host memory buffer 321 in the host memory 320.

The interrupt signal generator 250 may generate and output the interrupt signal in response to the interrupt signal generation request received from the host memory accessor 240 at step ⑤. The interrupt signal may be provided to the CPU 310 in the host 300. The interrupt signal is a signal that is to be identified by the host 300. When the CPU 310 receives the interrupt signal, the CPU 310 may check whether the interrupt signal is a signal notifying that the DTH information has been provided and stored in the host memory buffer 321 in the host memory 320. That is, the CPU 310 may check the type of the interrupt signal.

Figure 7:
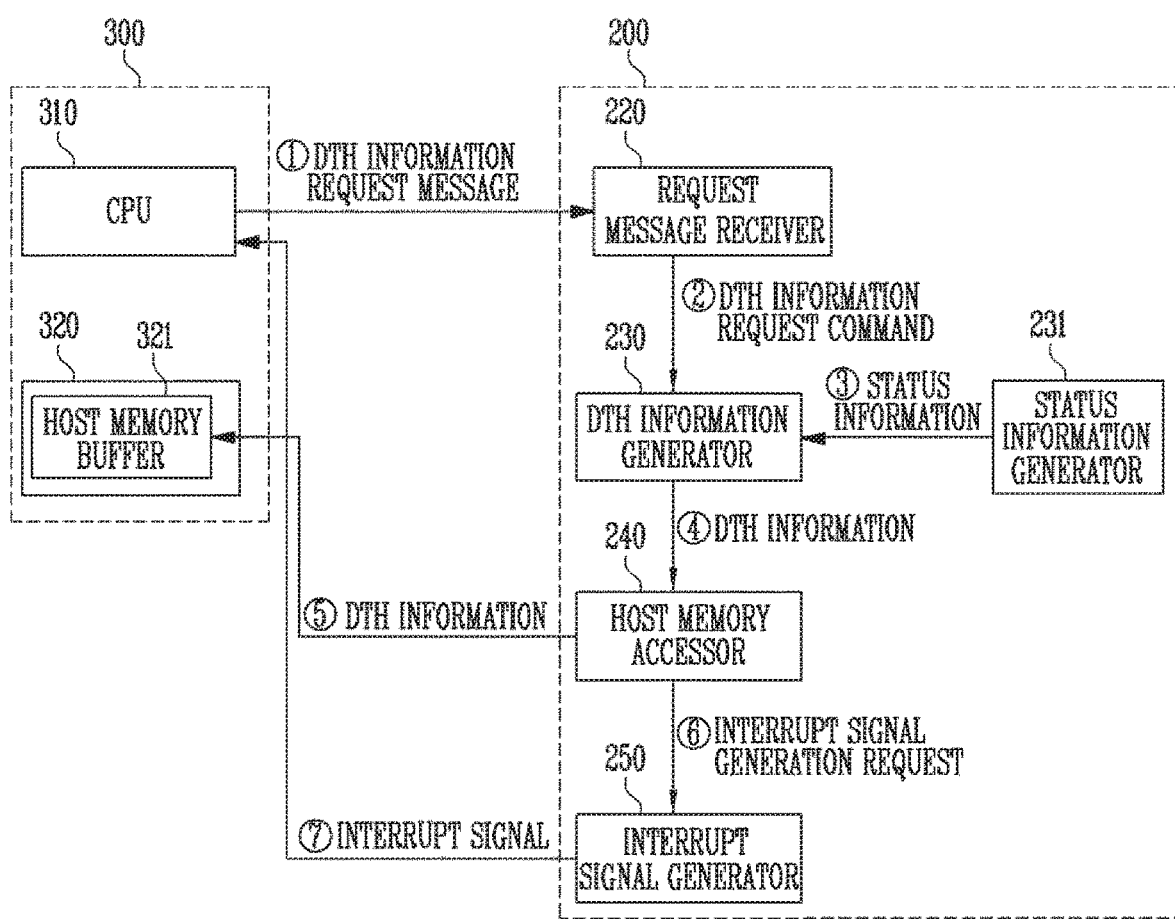
FIG. 7 is a diagram illustrating another embodiment the method for providing, by the memory controller, the DTH information to the host.

FIG. 7 is a diagram illustrating another embodiment of a method for providing, by the memory controller, the DTH information to the host.

FIG. 7 illustrates a method for generating DTH information and providing the DTH information to the host memory buffer 321 in response to a request from the host 300.

Referring to FIG. 7, the memory controller 200 may include the request message receiver 220, the DTH information generator 230, the status information generator 231, the host memory accessor 240, and the interrupt signal generator 250. In FIG. 7, the device information storage 210 of the memory controller 200 is omitted for clarity.

Referring to FIG. 7, the host 300 may include the CPU 310 and the host memory 320. In FIG. 7, the interface device 330 of the host 300 is omitted for clarity.

In order for the host 300 to acquire DTH information, the CPU 310 may provide a DTH information request message to the request message receiver 220 at step ①. The DTH information request message may be transferred to the storage device 50 for the host 300 to acquire status information of the storage device 50. The DTH information may include status information of the storage device 50, which is to be identified by the host 300. The DTH information may be provided from the storage device 50 to the host 300.

The request message receiver 220 may generate a DTH information request command corresponding to the DTH information request message. The DTH information request command may be provided to the DTH information generator 230 at step ②. The DTH information request command may be for requesting generation of DTH information.

The DTH information generator 230 may generate DTH information in response to the DTH information request command. Specifically, after the DTH information generator 230 receives the DTH information request command from the request message receiver 220, the DTH information generator 230 may receive status information of the storage device 50, which is to be identified by the host 300, from the status information generator 231 at step ③. The status information may include information on a status of the memory controller 200 and/or the memory device 100. Specifically, the status information generator 231 may generate status information, based on data received from the memory device 100 and/or data received in the memory controller 200.

The DTH information generator 230 may generate DTH information including the status information received from the status information generator 231 in response to the DTH information request command. The generated DTH information may be provided to the host memory accessor 240 at step ④. The DTH information provided to the host memory accessor 240 may be stored in an area of the host memory buffer 321 in the host memory 320. Therefore, whenever the request message receiver 220 receives the DTH information request message, the DTH information stored in the host memory buffer 321 may be updated.

The host memory accessor 240 may receive DTH information from the DTH information generator 230. The host memory accessor 240 may provide the received DTH information to the host memory buffer 321 in the host memory 320 at step ⑤. The DTH information may be stored in the host memory buffer 321. When the DTH information is stored in the host memory buffer 321, the host memory accessor 240 may request, through an interrupt signal generation request, generation of the interrupt signal notifying that the DTH information has been provided and stored in the host memory buffer 321 at step ⑥. The interrupt signal may notify that the DTH information has been provided and stored in the host memory buffer 321 in the host memory 320.

The interrupt signal generator 250 may generate and output the interrupt signal in response to the interrupt signal generation request received from the host memory accessor 240 at step ⑦. The interrupt signal may be provided to the CPU 310 in the host 300. The interrupt signal is to be identified by the host 300. When the CPU 310 receives the interrupt signal, the CPU 310 may check whether the interrupt signal is a signal notifying that the DTH information has been provided and stored in the host memory buffer 321 in the host memory 320.

FIG. 8 is a diagram illustrating a method for acquiring, by a host, e.g. the host 300, DTH information.

Referring to FIG. 8, the host 300 may include the CPU 310 and the host memory 320. The host memory 320 may include the host memory buffer 321 and the interrupt signal table 323. In FIG. 8, the interface device 330 of the host 300 is omitted for clarity.

FIG. 8 illustrates a process after the interrupt signal generator 250 of FIG. 7 generates and outputs the interrupt signal to the CPU 310.

After the CPU 310 receives the interrupt signal from the interrupt signal generator 250, the CPU 310 may request the interrupt signal table 323 of interrupt signal information used for checking whether the interrupt signal is a signal notifying that DTH information has been provided to the host memory buffer 321 at step ①. That is, the CPU 310 may determine whether the interrupt signal received from the interrupt signal generator 250 is a signal notifying that the DTH information has been provided and stored, based on the interrupt signal information.

The interrupt signal table 323 may store interrupt signal information, that is, information notifying that a specific operation has been performed, in the storage device 50. In an embodiment, the interrupt signal table 323 may include signal information notifying that the DTH information has been provided in the host memory buffer 321. The interrupt signal table 323 may provide the interrupt signal information to the CPU 310 in response to the interrupt signal information request of the CPU 310 at step ②. The interrupt signal information provided to the CPU 310 may include signal information notifying that the DTH information has been provided.

The interrupt signal provided to the CPU 310 may represent that the DTH information has been provided and stored in the host memory buffer 321. When the DTH information has been provided and stored, as indicated by the interrupt signal, the CPU 310 may request the host memory buffer 321 of DTH information at step ③. The host memory buffer 321 may provide the DTH information to the CPU 310 in response to the DTH information request at step ④. The CPU 310 receives the DTH information, so that the host 300 can acquire the DTH information including status information of the storage device 50.

The CPU 310 may perform a subsequent operation based on the DTH information received from the host memory buffer 321. That is, the host 300 may flexibly determine a time at which input/output of data and an internal operation of the host 300 are to be performed on the basis of a time at which an internal operation of the storage device 50 is to be performed. The subsequent operation may enable the host 300 to respond to an unexpected error situation of the storage device 50 by notifying the error situation to the host 300 in advance.

Figure 9:
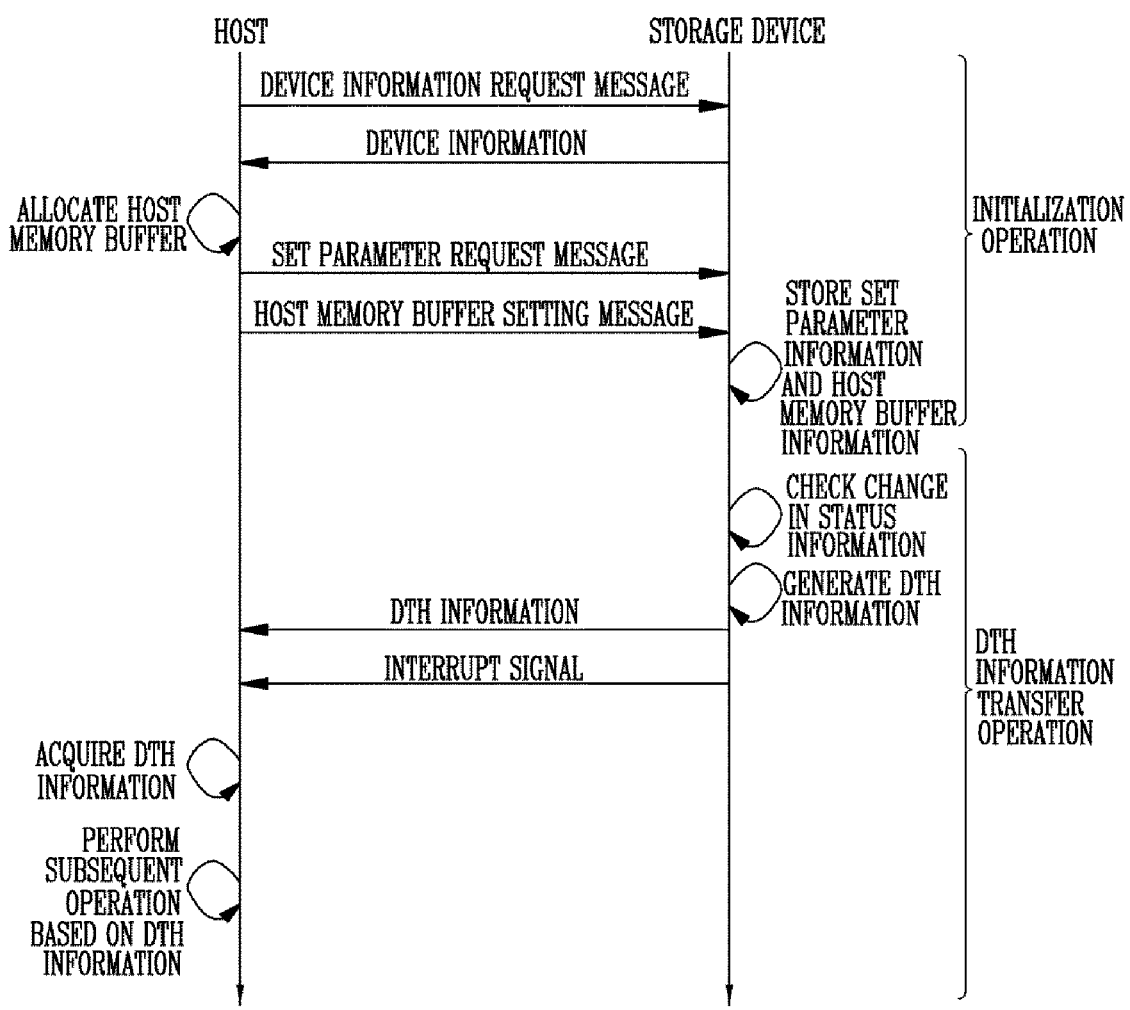
FIG. 9 is a timing diagram illustrating a method for providing, by the storage device, DTH information regardless of a request from the host.

FIG. 9 is a timing diagram illustrating a method for autonomously providing, by a storage device, e.g., storage device 50, DTH information even in the absence of a request from a host, e.g., host 300.

Referring to FIG. 9, the method of FIG. 9 may include an initialization operation for providing DTH information to the host 300 and a DTH information transfer operation of providing the DTH information to the host 300.

In an embodiment, the initialization operation may be performed before the DTH information transfer operation is performed.

The initialization operation may include providing, by the host 300, the device information request message to the storage device 50. Specifically, the CPU 310 may provide the device information request message to the device information storage 210 in the storage device 50. The device information request message may be for acquiring device information of the storage device 50. The device information may include the status information of the storage device 50, which is to be included in DTH information provided to the host 300 by the storage device 50, and the information on the size of the host memory buffer 321.

The initialization operation may include providing, by the storage device 50, device information to the host 300 in response to the device information request message. Specifically, the CPU 310 included in the host 300 may receive the device information from the device information storage 210. When the CPU 310 receives the device information, the CPU 310 may allocate the host memory buffer 321 or other area in the host memory 320, in which DTH information is to be stored. Also, the CPU 310 may determine status information of the storage device 50, which is to be identified by the CPU 310. When the host memory buffer 321 is allocated within the host memory 320, and the status information of the storage device 50, which is to be identified by the CPU 310, is determined, the CPU 310 may provide the storage device 50 with a message for storing the corresponding information in the storage device 50.

The initialization operation may include providing, by the host 300, a set parameter request message and a host memory buffer setting message to the storage device 50.

The set parameter request message may be for storing, in the storage device 50, a parameter for DTH information that is to be identified by the host 300 and a parameter for the interrupt signal that is to be identified by the host 300. The storage device 50 may store set parameter information corresponding to the set parameter request message. Specifically, the DTH information generator 230 may store a parameter for DTH information. After the DTH information generator 230 stores the parameter for the DTH information, the DTH information generator 230 may generate DTH information that is to be identified by the host 300. The interrupt signal generator 250 may store a parameter for the interrupt signal that is to be identified by the host 300 in response to an interrupt signal parameter setting command. After the interrupt signal generator 250 stores the parameter for the interrupt signal, the interrupt signal generator 250 may generate and output the interrupt signal that is to be identified by the host 300 when the DTH information is provided to the host 300.

In an embodiment, the host 300 may provide a host memory buffer setting message to the storage device 50. The host memory buffer setting message may be for storing host memory buffer information allocated within the host memory 320. Specifically, the CPU 310 in the host 300 may provide a host memory buffer setting message to the request message receiver 220 so as to provide information on the location in which DTH information is stored. The request message receiver 220 may provide the host memory buffer information to the DTH information generator 230 in response to the host memory buffer setting message. The DTH information generator 230 may store the host memory buffer information. The DTH information generator 230 may provide DTH information to the host memory buffer 321 through the host memory accessor 240, based on the stored host memory buffer information.

In an embodiment, the DTH information transfer operation may be performed after the initialization operation is performed.

The DTH information transfer operation may include operations for generating DTH information. Specifically, it may be checked whether the status of the storage device 50 has been changed. Therefore, when the status of the storage device 50 is changed, the status information generator 231 may generate changed status information. When the status of the storage device 50 is changed, the DTH information generator 230 may generate DTH information including the changed status information. The changed status information may be received from the status information generator 231. The DTH information generator 230 may generate DTH information whenever the status of the storage device 50 is changed. The generated DTH information may be provided to the host memory accessor 240. The host memory accessor 240 may provide the DTH information to the host 300. In an embodiment, the DTH information may be provided and stored in the host memory buffer 321 in the host memory 320. When the DTH information is stored in the host memory buffer 321, the interrupt signal generator 250 may output the interrupt signal based on the interrupt signal generation request received from the host memory accessor 240.

The CPU 310 may receive an interrupt signal from the interrupt signal generator 250. The CPU 310 may determine whether the interrupt signal is a signal notifying that DTH information has been provided and stored.

Then, the CPU 310 may request the host memory buffer 321 of the DTH information. The host memory buffer 321 may provide the DTH information to the host 300 in response to the DTH information request. The CPU 310 receives the DTH information, so that the host 300 can acquire the DTH information including the status information of the storage device 50.

The CPU 310 may perform a subsequent operation based on the DTH information received from the host memory buffer 321. That is, the host 300 may flexibly determine a time at which input/output of data and an internal operation of the host 300 are to be performed by considering a time at which an internal operation of the storage device 50 is to be performed. The subsequent operation may enable the host 300 to respond to an unexpected error situation of the storage device 50 by notifying the error situation to the host 300 in advance.

Figure 10:
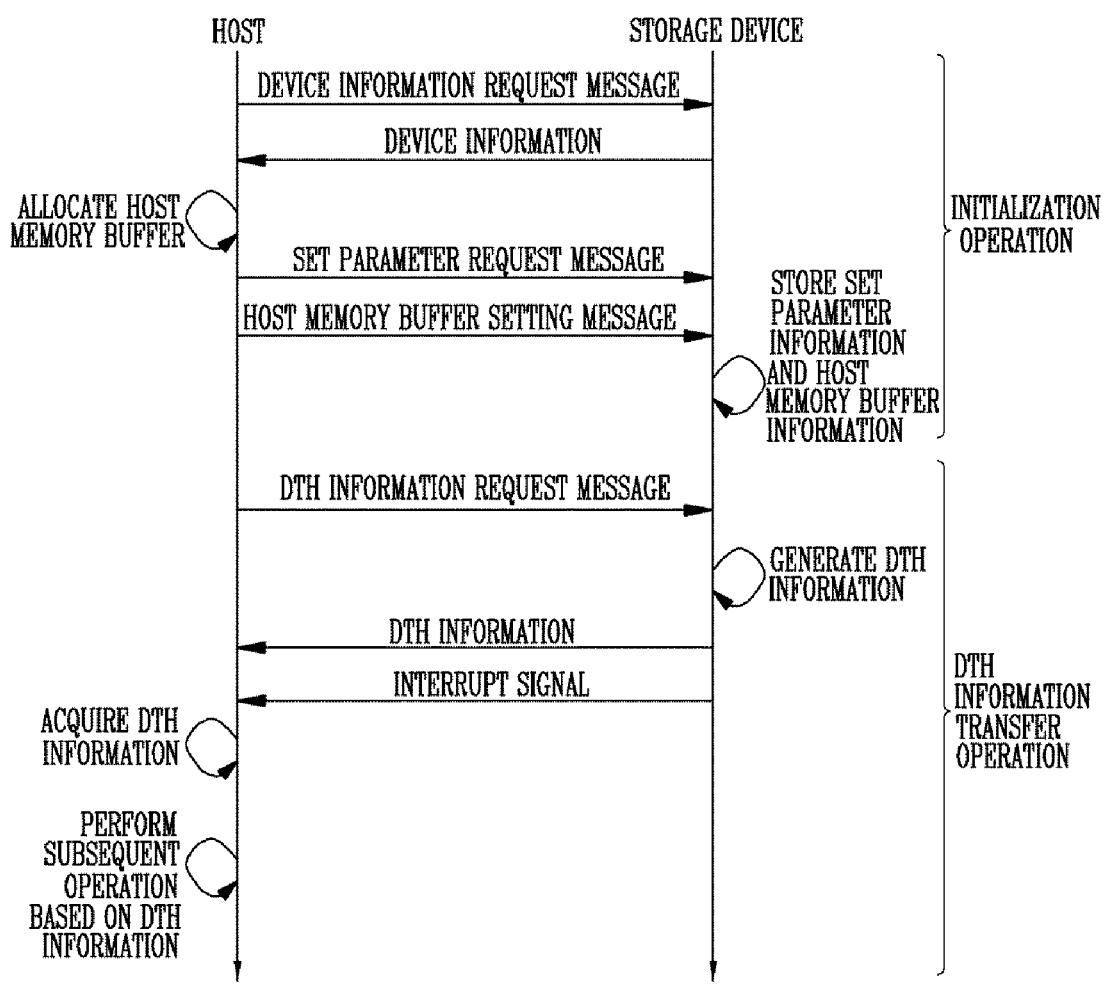
FIG. 10 is a timing diagram illustrating a method for providing, by the storage device, DTH information, based on a request from the host.

FIG. 10 is a timing diagram illustrating a method for providing, by a storage device, e.g., the storage device 50, DTH information, based on a request from a host, e.g., the host 300.

Referring to FIG. 10, the method may include an initialization operation for providing DTH information to the host 300 and a DTH information transfer operation of providing the DTH information to the host 300. The initialization operation is identical to the initialization operation of FIG. 9, and therefore description of that operation is omitted here. The DTH information transfer operation of FIG. 10, distinguished from the DTH information transfer operation of FIG. 9, is described below.

In an embodiment, the DTH information transfer operation may be performed after the initialization operation is performed.

The DTH information transfer operation may include operations for generating DTH information. Specifically, in order to the host 300 to acquire DTH information, the CPU 310 may provide the DTH information request message to the request message receiver 220. The request message receiver 220 may generate the DTH information request command corresponding to the DTH information request message. After the DTH information generator 230 receives the DTH information request command from the request message receiver 220, the DTH information generator 230 may receive the status information of the storage device 50, which is to be identified by the host 300, from the status information generator 231 that generates the status information of the storage device 50. The DTH information generator 230 may generate the DTH information including the status information received from the status information generator 231 in response to the DTH information request command.

The generated DTH information may be provided to the host memory accessor 240. The host memory accessor 240 may provide the DTH information to the host 300. In an embodiment, the DTH information may be provided and stored in the host memory buffer 321 in the host memory 320. When the DTH information is stored in the host memory buffer 321, the interrupt signal generator 250 may output the interrupt signal, based on the interrupt signal generation request received from the host memory accessor 240.

The CPU 310 may receive an interrupt signal from the interrupt signal generator 250. The CPU 310 may determine whether the interrupt signal is a signal notifying that DTH information has been provided and stored.

When the interrupt signal provided to the CPU 310 is the signal notifying that the DTH information has been provided and stored, the CPU 310 may request the host memory buffer 321 of the DTH information. The host memory buffer 321 may provide the DTH information to the host 300 in response to the DTH information request. The CPU 310 receives the DTH information, so that the host 300 can acquire the DTH information including the status information of the storage device 50.

The CPU 310 may perform a subsequent operation based on the DTH information received from the host memory buffer 321. That is, the host 300 may flexibly determine a time at which input/output of data and an internal operation of the host 300 are to be performed by considering a time at which an internal operation of the storage device 50 is to be performed. The subsequent operation may enable the host 300 to respond to an unexpected error situation of the storage device 50 by notifying the error situation to the host 300 in advance.

Figure 11:
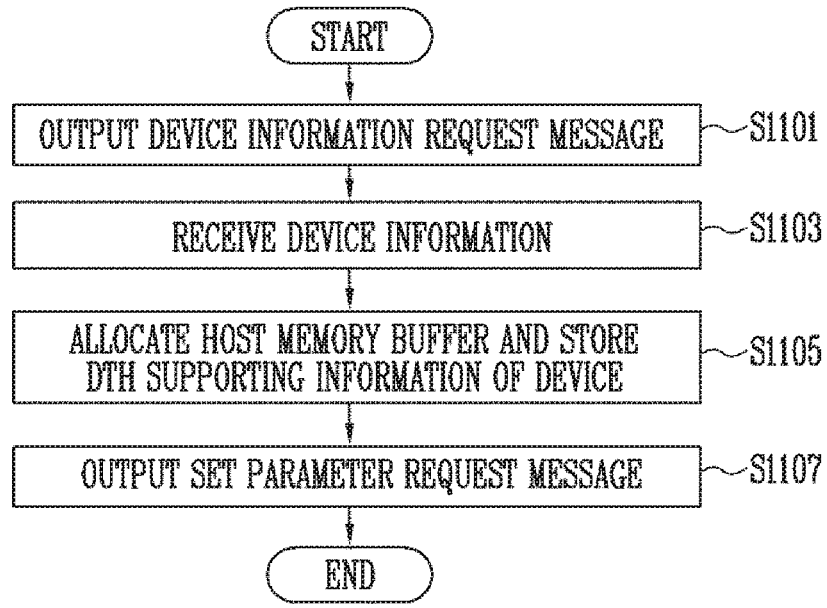
FIG. 11 is a diagram illustrating an initialization operation of the host in accordance with an embodiment of the present disclosure.

FIG. 11 is a diagram illustrating an initialization operation of a host, e.g., the host 300, according to an embodiment of the present disclosure.

Referring to FIG. 11, in step S1101, the CPU 310 may output the device information request message to the device information storage 210. The device information request message may be for requesting device information of the storage device 50. The device information may include the status information of the storage device 50, which is to be included in DTH information, and the information on the size of the host memory buffer 321.

In step S1103, the CPU 310 may receive the device information from the device information storage 210. The device information may be provided to the CPU 310 by the device information storage 210 in response to the device information request message.

In step S1105, the CPU 310 may provide the host memory 320 with HMB allocation information and DTH supporting information, based on the device information received from the device information storage 210. The host memory 320 may store the HMB allocation information and the DTH supporting information.

The HMB allocation information may include information on the size of the host memory buffer 321 that is to be allocated in the host memory 320 so as to store the DTH information. When the host memory 320 receives the HMB allocation information, the host memory 320 may allocate an area for storing the DTH information.

The DTH supporting information may include the status information of the storage device 50, which is to be provided to the host 300 by the storage device 50. That is, the DTH supporting information may include the status information of the storage device 50, which is to be included in the DTH information.

In step S1107, the CPU 310 may output the set parameter request message to the request message receiver 220 so as to set a parameter for generating information that is to be identified by the host 300 and a parameter for outputting a signal that is to be identified by the host 300. The information that is to be identified by the host 300 may be the DTH information. The signal that is to be identified by the host 300 may be the interrupt signal.

The CPU 310 may output the host memory buffer setting message together with the set parameter request message to the request message receiver 220 so as to provide information on the location in which the DTH information is stored within the host memory buffer 321. The host memory buffer setting message may be for storing host memory buffer information allocated by the host memory 320. The host memory 320 may receive the DTH information, based on the host memory buffer setting message.

Figure 12:
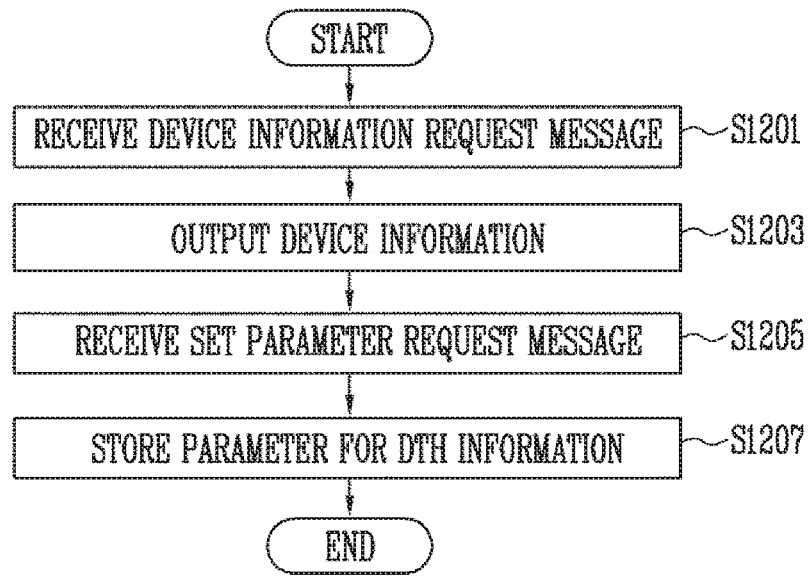
FIG. 12 is a diagram illustrating an initialization operation of the storage device in accordance with an embodiment of the present disclosure.

FIG. 12 is a diagram illustrating an initialization operation of a storage device, e.g., the storage device 50, in accordance with an embodiment of the present disclosure.

Referring to FIG. 12, in step S1201, the device information storage 210 may receive the device information request message. The device information request message may be for allowing the host 300 to acquire device information of the storage device 50.

In step S1203, the device information storage 210 may provide the device information to the CPU 310 in response to the device information request message. The device information may include the status information of the storage device 50, which is to be included in DTH information provided to the host 300 by the storage device 50, and the information on the size of the host memory buffer 321.

In step S1205, the request message receiver 220 may receive the set parameter request message from the CPU 310. The set parameter request message may be a request message for setting a parameter for generating information that is to be identified by the host 300 and a parameter for outputting a signal that is to be identified by the host 300. The request message receiver 220 may receive the host memory buffer setting message together with the set parameter request message. The host memory buffer setting message may be for storing host memory buffer information allocated by the host memory 320.

In step S1207, the DTH information generator 230 may receive the DTH parameter setting command corresponding to the set parameter request message. The DTH information generator 230 may store a parameter for DTH information that is to be identified by the host 300 in response to the DTH parameter setting command. Also, the DTH information generator 230 may store the host memory buffer information received from the request message receiver 220. The host memory buffer information may include information on the location in which the DTH information is stored within the host memory buffer 321. Specifically, the host memory buffer information may include information on row and column addresses of the area in which the DTH information is stored.

Figure 13:
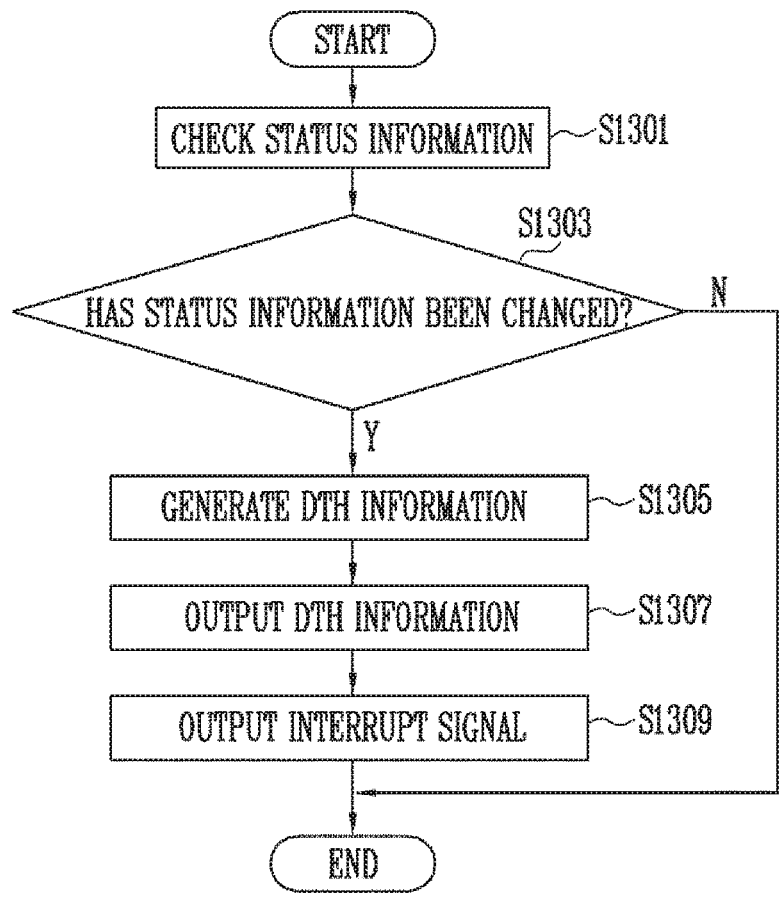
FIG. 13 is a diagram illustrating an operation of the storage device in accordance with an embodiment of the present disclosure.

FIG. 13 is a diagram illustrating an operation of a storage device, e.g., the storage device 50, in accordance with an embodiment of the present disclosure.

Referring to FIG. 13, in step S1301, the status information generator 231 may check the status information of the storage device 50. The status information STA_INF of the storage device 50 may include the device background operation status and information representing the device severity level. The status information STA_INF of the storage device 50 may include various status information in addition to the device background operation status and the information representing a device severity level. The status information STA_INF of the storage device 50 may include various status information in response to a request from the host 300.

In step S1303, the status information generator 231 may check whether the status information of the storage device 50 has been changed. Specifically, when the status information generator 231 checks the status information, the existence of information different from the existing status information may be determined. When the status information of the storage device 50 is changed, the status information generator 231 may generate changed status information. When the status information of the storage device 50 is changed, the operation proceeds to step S1305.

In the step S1305, when the status of the storage device 50 is changed, the DTH information generator 230 may generate the DTH information including the changed status information. The changed status information may be provided from the status information generator 231. The DTH information generator 230 may generate the DTH information whenever the status information of the storage device 50 is changed.

In step S1307, the DTH information generator 230 may output the DTH information including the changed status information. Specifically, the DTH information may be provided to the host memory accessor 240.

The host memory accessor 240 may provide the DTH information to the host 300. In an embodiment, the DTH information may be provided and stored in the host memory buffer 321 in the host memory 320.

In step S1309, when the DTH information is stored in the host memory buffer 321, the interrupt signal generator 250 may output the interrupt signal, based on the interrupt signal generation request received from the host memory accessor 240. The interrupt signal may notify that the DTH information has been provided and stored in the host memory buffer 321 in the host memory 320.

Figure 14:
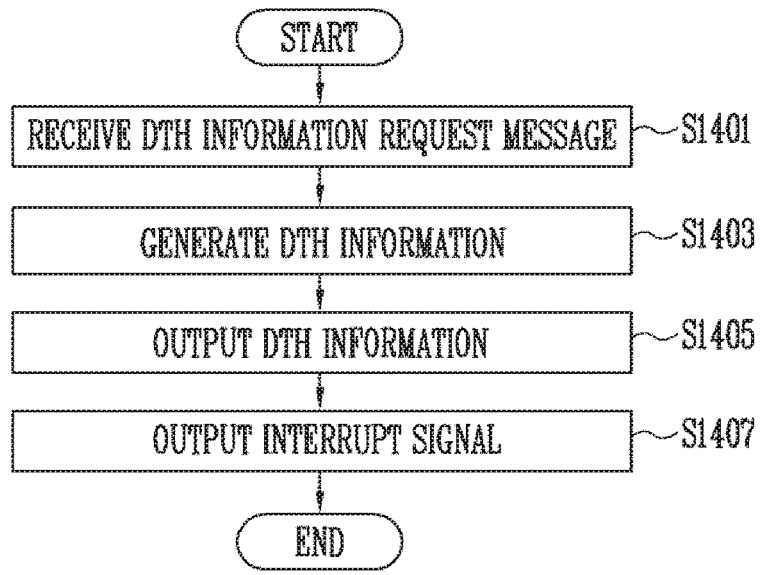
FIG. 14 is a diagram illustrating an operation of the storage device in accordance with an embodiment of the present disclosure.

FIG. 14 is a diagram illustrating an operation of the storage device 50 in accordance with another embodiment of the present disclosure.

Referring to FIG. 14, in step S1401, the request message receiver 220 may receive the DTH information request message from the CPU 310. The DTH information request message may be transferred to the storage device 50 so as for the host 300 to acquire status information of the storage device 50. The DTH information may include the status information of the storage device 50, which is to be identified by the host 300. The DTH information request message may be transferred to the storage device 50 so as for the host 300 to acquire the status information of the storage device 50. The DTH information may be provided from the storage device 50 to the host 300.

In step S1403, the DTH information generator 230 may generate the DTH information in response to the command corresponding to the DTH information request message. Specifically, after the DTH information generator 230 receives the DTH information request command from the request message receiver 220, the DTH information generator 230 may receive the status information of the storage device 50 from the status information generator 231. The DTH information generator 230 may generate the DTH information including the status information received from the status information generator 231 in response to the DTH information request command.

In step S1405, the DTH information may be provided to the host memory buffer 321 in the host memory 320. Specifically, the DTH information generator 230 may output the generated DTH information to the host memory accessor 240. The DTH information output to the host memory accessor 240 may be stored in the host memory buffer 321 in the host memory 320.

In step S1407, the interrupt signal generator 250 may output the interrupt signal, based on the interrupt signal generation request received from the host memory accessor 240. The interrupt signal may be provided to the CPU 310 in the host 300. The interrupt signal is a signal that is to be identified by the host 300.

Figure 15:
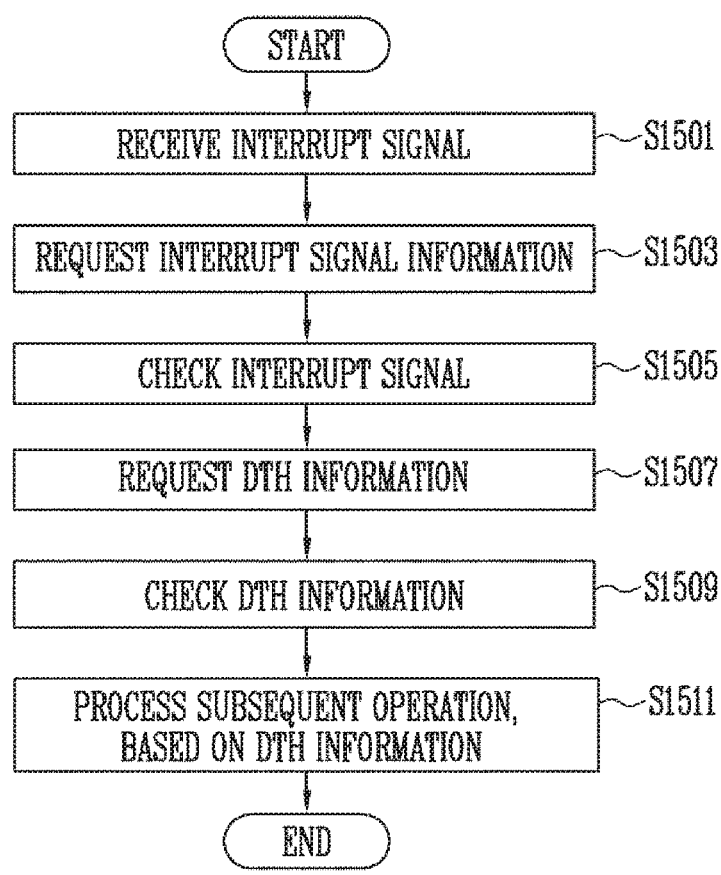
FIG. 15 is a diagram illustrating an operation of the host in accordance with an embodiment of the present disclosure.

FIG. 15 is a diagram illustrating an operation of a host, e.g., the host 300, in accordance with an embodiment of the present disclosure.

Referring to FIG. 15, in step S1501, the CPU 310 may receive the interrupt signal output by the interrupt signal generator 250. When the CPU 310 receives the interrupt signal, the CPU 310 may check whether the interrupt signal is a signal notifying that DTH information has been provided and stored in the host memory buffer 321 in the host memory 320 or other area thereof.

In step S1503, after the CPU 310 receives the interrupt signal from the interrupt signal generator 250, the CPU 310 may request the interrupt signal table 323 of the interrupt signal information used for checking whether the interrupt signal is a signal notifying that the DTH information has been provided in the host memory buffer 321. That is, the CUP 310 may determine whether the interrupt signal received from the interrupt signal generator 250 is a signal notifying that the DTH information has been provided and stored, based on the interrupt signal information.

In step S1505, the CPU 310 may receive the interrupt signal information from the interrupt signal table 323, to check whether the received interrupt signal is a signal notifying that the DTH information has been provided and stored. That is, the CPU 310 may check the type of the received interrupt signal.

In step S1507, when the interrupt signal provided to the CPU 310 is the signal notifying that the DTH information has been provided and stored, the CPU 310 may request the host memory buffer 321 of the DTH information.

In step S1509, the host memory buffer 321 may provide the DTH information to the CPU 310 in response to the DTH information request, and the CPU 310 may check the DTH information. The CPU 310 receives the DTH information, so that the host 300 can acquire the DTH information including status information of the storage device 50.

In step S1511, the CPU 310 may perform a subsequent operation, based on the DTH information received from the host memory buffer 321. That is, the host 300 may flexibly determine a time at which input/output of data and an internal operation of the host 300 are to be performed by considering a time at which an internal operation of the storage device 50 is to be performed. The subsequent operation may enable the host 300 to respond to an unexpected error situation of the storage device 50 by notifying the error situation to the host 300 in advance.

Figure 16:
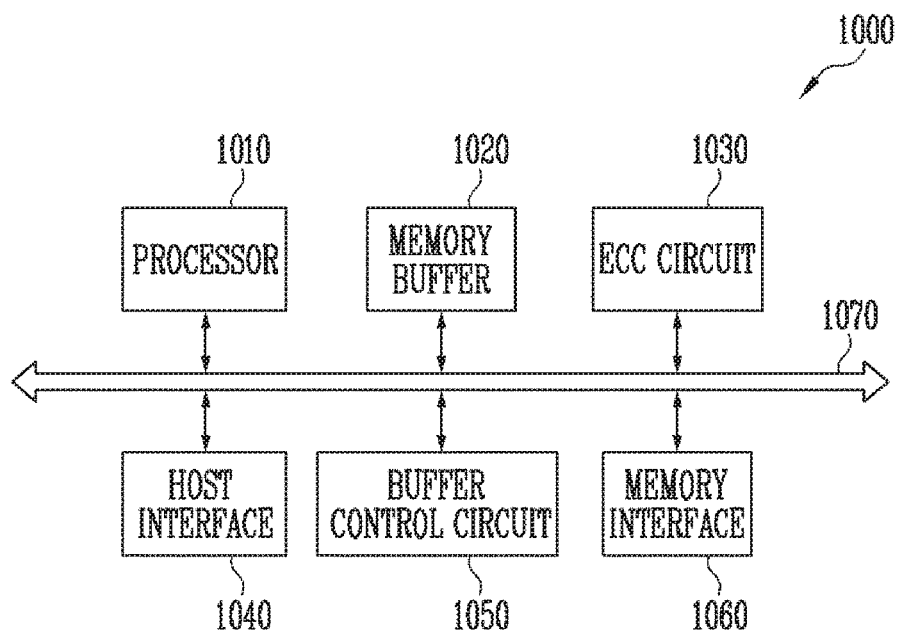
FIG. 16 is a diagram illustrating an embodiment of the memory controller of FIG. 1.

FIG. 16 is a diagram illustrating another embodiment of the memory controller of FIG. 1.

A memory controller 1000 is coupled to a host and a memory device. The memory controller 1000 is configured to access the memory device in response to a request received from the host. For example, the memory controller 1000 is configured to control read, program, erase, and background operations of the memory device. The memory controller 1000 is configured to provide an interface between the memory device and the host. The memory controller 1000 is configured to drive firmware for controlling the memory device.

Referring to FIG. 16, the memory controller 1000 may include a processor 1010, a memory buffer 1020, an error correction code (ECC) circuit 1030, a host interface 1040, a buffer control circuit 1050, a memory interface 1060, and a bus 1070.

The bus 1070 may be configured to provide channels between components of the memory controller 1000.

The processor 1010 may control overall operations of the memory controller 1000, and perform a logical operation. The processor 1010 may communicate with the external host through the host interface 1040, and communicate with the memory device through the memory interface 1060. Also, the processor 1010 may communicate with the memory buffer 1020 through the buffer control circuit 1050. The processor 1010 may control an operation of the storage device, using the memory buffer 1020 as a working memory, a cache memory or a buffer memory.

The processor 1010 may perform a function of a flash translation layer (FTL). The processor 1010 may translate a logical address (LA) provided by the host through the FTL into a physical address (PA). The FTL may receive an LA, using a mapping table, to be translated into a PA. Several address mapping methods of the FTL exist according to mapping units. A representative address mapping method includes a page mapping method, a block mapping method, and a hybrid mapping method.

The processor 1010 is configured to randomize data received from the host. For example, the processor 1010 may randomize data received from the host, using a randomizing seed. The randomized data is provided as data to be stored to the memory device to be programmed in the memory cell array.

In a read operation, the processor 1010 is configured to derandomize data received from the memory device. For example, the processor 1010 may derandomize data received from the memory device, using a derandomizing seed. The derandomized data may be output to the host.

In an embodiment, the processor 1010 may perform randomizing and derandomizing by executing software or firmware.

The memory buffer 1020 may be used as the working memory, the cache memory, or the buffer memory of the processor 1010. The memory buffer 1020 may store codes and commands, which are executed by the processor 1010. The memory buffer 1020 may include a Static RAM (SRAM) or a Dynamic RAM (DRAM).

The ECC circuit 1030 may perform an ECC operation. The ECC circuit 1030 may perform ECC encoding on data to be written in the memory device through the memory interface 1060. The ECC encoded data may be transferred to the memory device through the memory interface 1060. The ECC circuit 1030 may perform ECC decoding on data received from the memory device through the memory interface 1060. In an example, the ECC circuit 1030 may be included as a component of the memory interface 1060 in the memory interface 1060.

The host interface 1040 may communicate with the external host under the control of the processor 1010. The host interface 1040 may communicate with the host, using at least one of various communication protocols, such as a Universal Serial bus (USB), a Serial AT Attachment (SATA), a High Speed InterChip (HSIC), a Small Computer System Interface (SCSI), Firewire, a Peripheral Component Interconnection (PCI), a PCI express (PCIe), a nonvolatile memory express (NVMe), a universal flash storage (UFS), a Secure Digital (SD), a Multi-Media Card (MMC), an embedded MMC (eMMC), a Dual In-line Memory Module (DIMM), a Registered DIMM (RDIMM), and a Load Reduced DIMM (LRDIMM).

The buffer control circuit 1050 is configured to control the memory buffer 1020 under the control of the processor 1010.

The memory interface 1060 is configured to communicate with the memory device under the control of the processor 1010. The memory interface 1060 may communicate a command, an address, and data with the memory device through a channel.

In an example, the memory controller 1000 may not include the memory buffer 1020 and the buffer control circuit 1050. The memory buffer 1020 and/or the buffer control circuit 1050 may be provided separately or the function(s) of the memory buffer 1020 and/or the buffer control circuit 1050 is/are distributed among one or more other components in the memory controller 1000.

In an example, the processor 1010 may control an operation of the memory controller 1000 by using codes. The processor 1010 may load codes from a nonvolatile memory device (e.g., a read only memory (ROM)) provided in the memory controller 1000. In another example, the processor 1010 may load codes from the memory device through the memory interface 1060.

In an example, the bus 1070 of the memory controller 1000 may be divided into a control bus and a data bus. The data bus may be configured to transmit data in the memory controller 1000, and the control bus may be configured to transmit control information such as a command and an address in the memory controller 1000. The data bus and the control bus are separated from each other, and may not interfere or influence with each other. The data bus may be coupled to the host interface 1040, the buffer control circuit 1050, the ECC circuit 1030, and the memory interface 1060. The control bus may be coupled to the host interface 1040, the processor 1010, the buffer control circuit 1050, the memory buffer 1020, and the memory interface 1060.

Figure 17:
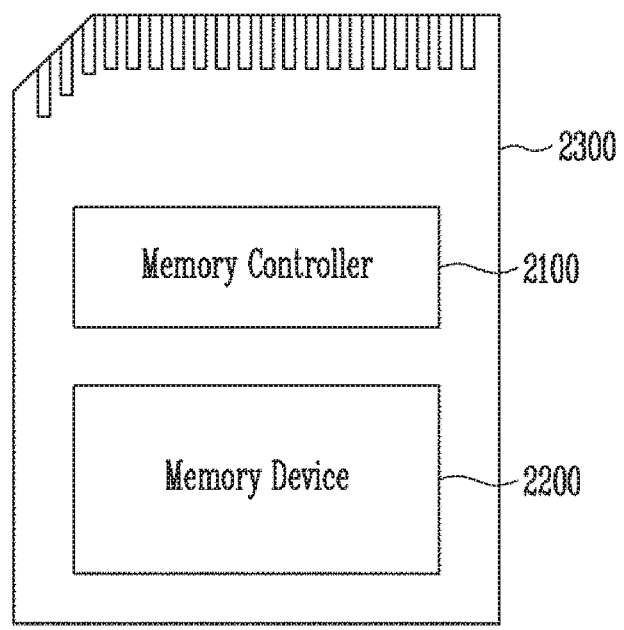
FIG. 17 is a block diagram illustrating a memory card system to which the storage device is applied in accordance with an embodiment of the present disclosure.

FIG. 17 is a block diagram illustrating a memory card system to which the storage device is applied in accordance with an embodiment of the present disclosure.

Referring to FIG. 17, the memory card system 2000 includes a memory controller 2100, a memory device, and a connector 2300.

The memory controller 2100 is coupled to the memory device 2200. The memory controller 2100 is configured to access the memory device 2200. For example, the memory controller 2100 is configured to control read, write, erase, and background operations of the memory device 2200. The memory controller 2100 is configured to provide an interface between the memory device 2200 and a host. The memory controller 2100 is configured to drive firmware for controlling the memory device 2200. The memory device 2200 may be implemented identically to the memory device 100 described with reference to FIG. 1.

In an example, the memory controller 2100 may include components such as a Random Access Memory (RAM), a processor, a host interface, a memory interface, and an ECC circuit.

The memory controller 2100 may communicate with an external device through the connector 2300. The memory controller 2100 may communicate with the external device (e.g., the host) according to a specific communication protocol. In an example, the memory controller 2100 may communicate with the external device through at least one of various communication protocols such as a Universal Serial Bus (USB), Multi-Media Card (MMC) an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), firewire, a Universal Flash Storage (UFS), Wi-Fi, Bluetooth, and NVMe.

In an example, the memory device 2200 may be implemented with various nonvolatile memory devices such as an Electrically Erasable and Programmable ROM (EPROM), a NAND flash memory, a NOR flash memory, a Phase-change RAM (PRAM), a Resistive RAM (ReRAM), a Ferroelectric RAM (FRAM), and a Spin Torque Transfer magnetic RAM (STT-MRAM).

The memory controller 2100 and the memory device 2200 may be integrated into a single semiconductor device to constitute a memory card such as a PC card (Personal Computer Memory Card International Association (PCM-CIA)), a Compact Flash (CF) card, a Smart Media Card (SM and SMC), a memory stick, a Multi-Media Card (MMC, RS-MMC, MMCmicro and eMMC), an SD card (SD, miniSD, microSD and SDHC), and/or a Universal Flash Storage (UFS).

Figure 18:
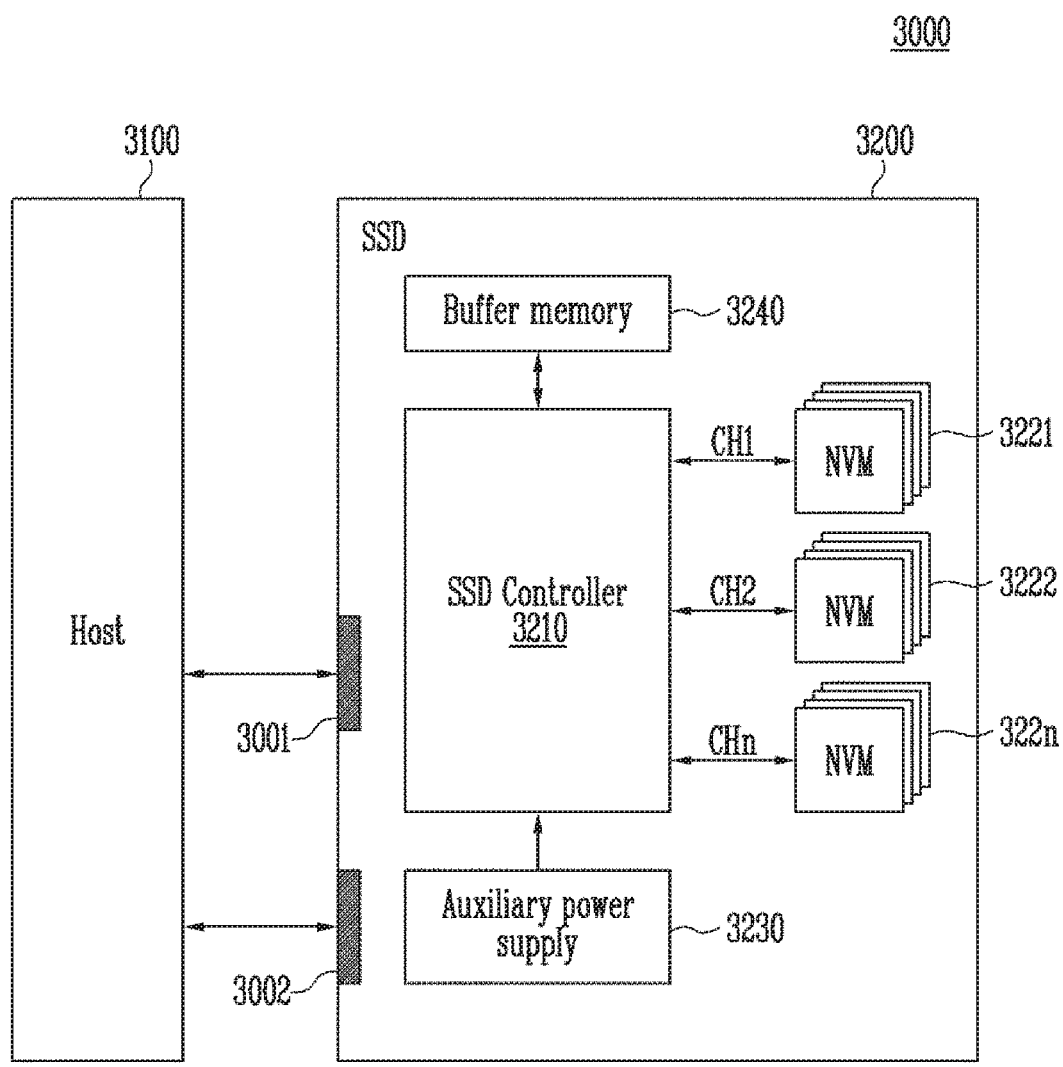
FIG. 18 is a block diagram illustrating a Solid State Drive (SSD) to which the storage device is applied in accordance with an embodiment of the present disclosure.

FIG. 18 is a block diagram illustrating a Solid State Drive (SSD) to which the storage device is applied in accordance with an embodiment of the present disclosure.

Referring to FIG. 18, the SSD system 3000 includes a host 3100 and an SSD 3200. The SSD 3200 exchanges a signal SIG with the host 3100 through a signal connector 3001, and receives power PWR through a power connector 3002. The SSD 3200 includes an SSD controller 3210, a plurality of flash memories 3221 to 322n, an auxiliary power supply 3230, and a buffer memory 3240.

In an embodiment, the SSD controller 3210 may serve as the memory controller 200 described with reference to FIG. 1.

The SSD controller 3210 may control the plurality of flash memories 3221 to 322n in response to a signal received from the host 3100. In an example, the signal may be based on an interface between the host 3100 and the SSD 3200. For example, the signal may be defined by at least one of interfaces such as a Universal Serial Bus (USB), Multi-Media Card (MMC) an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), a firewire, a Universal Flash Storage (UFS), a WI-FI, a Bluetooth, and an NVMe.

The auxiliary power supply 3230 is coupled to the host 3100 through the power connector 3002. When the supply of power from the host 3100 is not smooth, the auxiliary power supply 3230 may provide power of the SSD 3200. In an example, the auxiliary power supply 3230 may be located in the SSD 3200, or be located at the outside of the SSD 3200. For example, the auxiliary power supply 3230 may be located on a main board, and provide auxiliary power to the SSD 3200.

The buffer memory 3240 operates as a buffer memory of the SSD 3200. For example, the buffer memory 3240 may temporarily store data received from the host 3100 or data received from the plurality of flash memories 3221 to 322n, or temporarily store meta data (e.g., a mapping table) of the flash memories 3221 to 322n. The buffer memory 3240 may include volatile memories such as a DRAM, an SDRAM, a DDR SDRAM, an LPDDR SDRAM, and a GRAM or nonvolatile memories such as a FRAM, a ReRAM, an STT-MRAM, and a PRAM.

Figure 19:
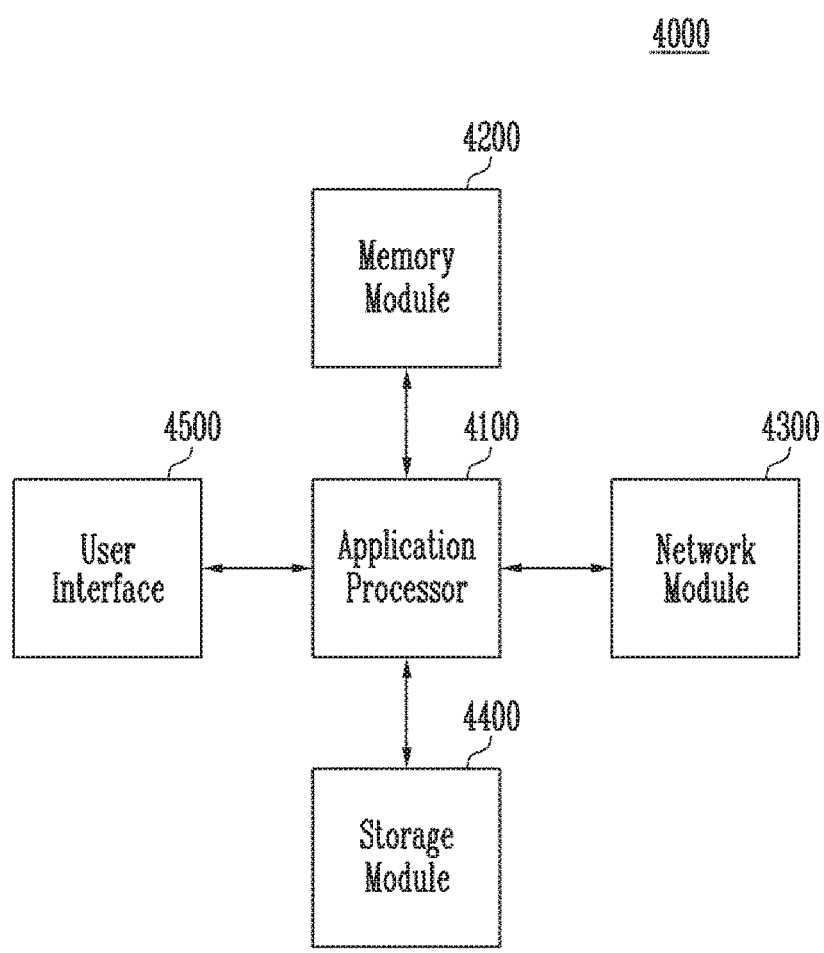
FIG. 19 is a block diagram illustrating a user system to which the storage device is applied in accordance with an embodiment of the present disclosure.

FIG. 19 is a block diagram illustrating a user system to which the storage device is applied in accordance with an embodiment of the present disclosure.

Referring to FIG. 19, the user system 4000 includes an application processor 4100, a memory module 4200, a network module 4300, a storage module 4400, and a user interface 4500.

The application processor 4100 may drive components included in the user system 4000, an operating system (OS), a user program, or the like. In an example, the application processor 4100 may include controllers for controlling components included in the user system 4000, interfaces, a graphic engine, and the like. The application processor 4100 may be provided as a System-on-Chip (SoC).

The memory module 4200 may operate as a main memory, working memory, buffer memory or cache memory of the user system 4000. The memory module 4200 may include volatile random access memories such as a DRAM, an SDRAM, a DDR SDRAM, a DDR2 SDRM, a DDR3 SDRAM, an LPDDR SDRAM, an LPDDR2 SDRAM, and an LPDDR3 SDRAM or volatile random access memories such as a PRAM, a ReRAM, an MRAM, and a FRAM. In an example, the application processor 4100 and the memory module 4200 may be provided as one semiconductor package by being packaged based on a Package on Package (PoP).

The network module 4300 may communicate with external devices. In an example, the network module 4300 may support wireless communications such as Code Division Multiple Access (CDMA), Global System for Mobile communication (GSM), Wideband CDMA (WCDMA), CDMA-2000, Time Division Multiple Access (TDMA), Long Term Evolution (LTE), Wimax, WLAN, UWB, Bluetooth, and Wi-Fi. In an example, the network module 4300 may be included in the application processor 4100.

The storage module 4400 may store data. For example, the storage module 4400 may store data received from the application processor 4100. Alternatively, the storage module 4400 may transmit data stored therein to the application processor 4100. In an example, the storage module 4400 may be implemented with a nonvolatile semiconductor memory device such as a Phase-change RAM (PRAM), a Magnetic RAM (MRAM), a Resistive RAM (RRAM), a NAND flash, a NOR flash, or a NAND flash having a three-dimensional structure. In an example, the storage module 4400 may be provided as a removable drive such as a memory card of the user system 4000 or an external drive.

In an example, the storage module 4400 may include a plurality of nonvolatile memory devices, and the plurality of nonvolatile memory devices may operate identically to the memory device described with reference to FIG. 2. The storage module 4400 may operate identically to the storage device 50 described with reference to FIG. 1.

The user interface 4500 may include interfaces for inputting data or commands to the application processor 4100 or outputting data to an external device. In an example, the user interface 4500 may include user input interfaces such as a keyboard, a keypad, a button, a touch panel, a touch screen, a touch pad, a touch ball, a camera, a microphone, a gyroscope sensor, a vibration sensor and a piezoelectric element. The user interface 4500 may include user output interfaces such as a Liquid Crystal Display (LCD), an Organic Light Emitting Diode (OLED) display device, an Active Matrix OLED (AMOLED) display device, an LED, a speaker, and a monitor.

In accordance with embodiments of the present disclosure, a storage device having improved operation speed and an operating method thereof are provided.

While the present disclosure has been shown and described with reference to certain embodiments thereof, it will be understood by those skilled in the art in light of the present disclosure that various changes in form and details may be made therein without departing from the spirit and scope of the present disclosure as defined by the appended claims and their equivalents. Therefore, the scope of the present disclosure should not be limited to the above-described embodiments but should be determined by not only the appended claims but also the equivalents thereof.

In the above-described embodiments, all steps may be selectively performed or part of the steps may be omitted. In each embodiment, the steps are not necessarily performed in accordance with the described order and may be rearranged. The embodiments disclosed in this specification and drawings are only examples to facilitate an understanding of the present disclosure; the present disclosure is not limited thereto. That is, it should be apparent to those skilled in the art that various modifications can be made on the basis of the technological scope of the present disclosure.

In presenting embodiments, specific terminologies are used here. However, such terminologies, are only to explain the embodiments of the present disclosure. Therefore, the present disclosure is not restricted to the above-described embodiments, as many variations are possible within the spirit and scope of the present disclosure. It should be apparent to those skilled in the art that various modifications can be made on the basis of the technological scope of the present disclosure in addition to the embodiments disclosed herein.

What is claimed is:

1. A memory system, comprising:
   a host comprising a host memory and a processor; and
   a storage device comprising a memory device and a memory controller configured to provide the host with Device-To-Host (DTH) information to be stored in the host memory, and provide the processor with an interrupt signal notifying that the DTH information has been provided to the host,
   wherein the processor is configured to control the storage device to perform an operation using the DTH information stored in the host memory after the interrupt signal is received from the memory controller.

2. The memory system of claim 1, wherein the memory controller comprises:
   a status information generator configured to generate status information of the storage device,
   a DTH information generator configured to generate the DTH information including the status information, and
   a host memory accessor configured to provide the host with the DTH information received from the DTH information generator.

3. The memory system of claim 2, wherein the host memory accessor is configured to provide the host with the DTH information whenever a status of the storage device is changed.

4. The memory system of claim 2, wherein when a status of the storage device is changed, the DTH information generator generates the DTH information including changed status information and outputs the DTH information to the host memory accessor.

5. The memory system of claim 2, wherein the DTH information is stored in a host memory area in the host memory.

6. The memory system of claim 5, wherein the storage device comprises
   a device information storage configured to store device information of the storage device, and
   wherein the device information includes the status information that is to be included in the DTH information and information on a size of the host memory area.

7. The memory system of claim 6, wherein the device information storage provides the device information to the host in response to a device information request message of the host.

8. The memory system of claim 6, wherein the status information includes at least one of information on a background operation of the storage device, information on a temperature of the storage device, and information on a defect of the storage device.

9. The memory system of claim 2, wherein the storage device comprises
a request message receiver configured to receive a request message from the host, and
wherein the request message receiver provides, when the request message is a set parameter request message, a command corresponding to the set parameter request message to the DTH information generator.

10. The memory system of claim 9,
wherein the DTH information generator stores a parameter for the DTH information that is to be identified by the host, based on the command, and
wherein the memory controller comprises an interrupt signal generator configured to store a parameter for the interrupt signal that is to be identified by the host, based on the command.

11. A method for operating a memory system including a storage device and a host, the method comprising:
generating, by the storage device, Device-To-Host (DTH) information to be transferred to the host;
providing, by the storage device, the host with the DTH information to be stored in a host memory of the host;
generating, by the storage device, an interrupt signal notifying that the DTH information has been provided to the host;
providing, by the storage device, the host with the interrupt signal; and
controlling, by the host, the storage device to perform an operation using the DTH information stored in the host memory after the interrupt signal is received from the storage device.

12. The method of claim 11, further comprising:
receiving, by the storage device, a device information request message from the host; and
providing, by the storage device, the host with device information of the storage device in response to the device information request message.

13. The method of claim 12, wherein the providing of the device information includes providing status information that is to be included in the DTH information and information on the size of the host memory buffer area.

14. The method of claim 12, further comprising:
receiving, by the storage device, a set parameter request message from the host; and
generating, by the storage device, a command corresponding to the set parameter request message.

15. The method of claim 14, further comprising:
storing, by the storage device, a parameter for the DTH information that is to be identified by the host and a parameter for the interrupt signal that is to be identified by the host, based on the command.

16. The method of claim 15, wherein the generating of the DTH information includes generating the DTH information that is to be identified by the host.

17. The method of claim 15, wherein the generating of the interrupt signal includes generating an interrupt signal that is to be identified by the host when the DTH information is provided to the host.

18. A host for controlling a storage device including a memory device and a memory controller for controlling the memory device, the host comprising:
a host memory configured to, in response to Device-To-Host (DTH) information of the storage device being received from the memory controller, store the DTH information in a host memory buffer area allocated by device information of the storage device; and
a processor configured to:
receive, from the memory controller, an interrupt signal notifying that the DTH information of the storage device has been stored, and
control the storage device to perform an operation using the DTH information stored in the host memory buffer area, in response to the interrupt signal being received from the memory controller,
wherein the DTH information includes status information of the storage device.

* * * * *